US011403946B2

(12) United States Patent
Jang et al.

(10) Patent No.: US 11,403,946 B2
(45) Date of Patent: Aug. 2, 2022

(54) VEHICLE CONTROL DEVICE AND CONTROL METHOD PROVIDED IN VEHICLE

(71) Applicant: LG Electronics Inc., Seoul (KR)

(72) Inventors: Yujune Jang, Seoul (KR); Jayoen Kim, Seoul (KR); Hyunju Kim, Seoul (KR); Sungil Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 16/490,425

(22) PCT Filed: Apr. 10, 2019

(86) PCT No.: PCT/KR2019/004244
§ 371 (c)(1),
(2) Date: Aug. 30, 2019

(87) PCT Pub. No.: WO2019/221390
PCT Pub. Date: Nov. 21, 2019

(65) Prior Publication Data
US 2021/0355738 A1 Nov. 18, 2021

Related U.S. Application Data

(60) Provisional application No. 62/670,854, filed on May 13, 2018.

(51) Int. Cl.
*B60Q 1/32* (2006.01)
*G08G 1/133* (2006.01)
(Continued)

(52) U.S. Cl.
CPC ............... *G08G 1/133* (2013.01); *B60Q 1/32* (2013.01); *B60Q 1/50* (2013.01); *B60Q 3/47* (2017.02);
(Continued)

(58) Field of Classification Search
CPC combination set(s) only.
See application file for complete search history.

(56) References Cited

U.S. PATENT DOCUMENTS 10,065,555 B2 * 9/2018 Abrams .................. B60Q 1/24
10,794,107 B2 * 10/2020 Salter ..................... B60R 25/24
2020/0375006 A1 * 11/2020 Erickson ................ B60Q 1/50

FOREIGN PATENT DOCUMENTS

JP 2014202859 10/2014
JP 2015200933 11/2015
(Continued)

OTHER PUBLICATIONS

Notice of Allowance in Korean Appln. No. 10-2018-6135416, dated Mar. 23. 2020, 13 pages (with English translation).
(Continued)

*Primary Examiner* — Robert J May
(74) *Attorney, Agent, or Firm* — Fish & Richardson P.C.

(57) ABSTRACT

The present invention relates to a vehicle control device provided in a vehicle and a control method of a vehicle. A vehicle control device according to an embodiment of the present invention includes a beam output unit for irradiating light to a road surface of a periphery of a vehicle, and a processor for sensing whether an object approaching toward a vehicle door is present or not via a sensing unit provided in the vehicle when a control command for opening the vehicle door is received after the vehicle stops, and, controlling the beam output unit so that information notifying the object approaching toward the vehicle door is irradiated to the road surface of the periphery of the vehicle door in a state in which the vehicle door is closed based on the presence of the object approaching toward the vehicle door.

19 Claims, 17 Drawing Sheets

(51) Int. Cl.
*B60Q 3/76* (2017.01)
*B60Q 3/47* (2017.01)
*B60Q 1/50* (2006.01)
*E05F 15/73* (2015.01)

(52) U.S. Cl.
CPC ............ *B60Q 3/76* (2017.02); *B60Q 2400/20* (2013.01); *B60Q 2400/40* (2013.01); *E05F 15/73* (2015.01); *E05Y 2400/44* (2013.01); *E05Y 2400/45* (2013.01); *E05Y 2900/506* (2013.01)

(56) References Cited

FOREIGN PATENT DOCUMENTS

| | | |
|---|---|---|
| JP | 2016065938 | 4/2016 |
| JP | 2016078460 | 5/2016 |
| JP | 2018030655 | 3/2018 |
| KR | 20040007771 | 1/2004 |
| KR | 20120040518 | 4/2012 |
| KR | 20120107602 | 10/2012 |
| KR | 101476811 | 12/2014 |
| KR | 20170010645 | 2/2017 |
| KR | 101740395 | 5/2017 |
| KR | 101744198 | 6/2017 |
| KR | 20170112735 | 10/2017 |
| KR | 20180032110 | 3/2018 |

OTHER PUBLICATIONS

Notice of Allowance in Korean Appln. No. 10-2018-0139439, dated Apr. 7, 2020, 11 pages (with English translation).

\* cited by examiner (a)

(b)

(c)

(a)

(b)

VEHICLE CONTROL DEVICE AND CONTROL METHOD PROVIDED IN VEHICLE

CROSS-REFERENCE TO RELATED APPLICATIONS

This application is the National Stage filing under 35 U.S.C. 371 of International Application No. PCT/KR2019/004244, filed on Apr. 10, 2019, which claims the benefit of earlier filing date and right of priority to US Provisional Application No. 62/670,854 filed May 13, 2018, the contents of both are incorporated by reference.

TECHNICAL FIELD

The present invention relates to a vehicle control device provided in a vehicle and a control method of a vehicle.

BACKGROUND ART

A vehicle is an apparatus capable of moving a user in the user-desired direction. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

The vehicle may be provided with various types of lamps. In general, the vehicle is provided with various vehicle lamps having a lighting function so that an object located at a periphery of the vehicle may be identified easily when the vehicle is driving at night and a signal function to notify other vehicles or other road users of a driving state of the vehicle.

For example, the vehicle may be provided with a device that operates in a directly light emitting method by using a lamp, such as a headlight that radiates light in front to secure vision of a driver, a brake light that is turned on when a brake is pressed, and turn signals used at the timing of turning right or left.

As another example, reflectors for reflecting light so that the vehicle may be easily recognized from an outside may be provided in the front and the rear of the vehicle.

Such vehicle lamps are regulated by laws with respect to installation criteria and standard thereof to fully utilize each function.

Meanwhile, recently, as an Advanced Driving Assist System (ADAS) has been developed actively, necessity of technology development capable of maximizing convenience and safety of a user in vehicle operation is emerging.

In addition, recently, various technologies for autonomous driving of vehicles have been developed actively.

Further, the vehicle described herein may include all kinds of transportation means such as a car, taxi, bus, subway, train, tram or the like. In the case of vehicles, there is a problem in that a user gets on and off frequently so that a lot of accidents with an object approaching toward a vehicle door occurs in the process of getting on and off the vehicle.

DISCLOSURE

Technical Problem

The present invention is directed to providing a vehicle control device for guiding a user to get on and off a vehicle in an optimized manner and a control method thereof.

In addition, the present invention is directed to providing a vehicle control device capable of notifying a user of an object approaching toward a vehicle door in an optimized manner when the user is getting on and off a vehicle, and a control method thereof.

Further, the present invention is directed to providing a vehicle control device capable of visually guiding a user for a getting on and off location at a stop where a vehicle stops, and a control method thereof.

The objects of the present invention are not limited to those described above, and other unmentioned aspects should be clearly understood by those skilled in the art from the description below.

Technical Solution

In order to achieve the above object, a vehicle control device according to an embodiment of the present invention includes a beam output unit for irradiating light to a road surface of a periphery of a vehicle, and a processor for sensing whether an object approaching toward a vehicle door is present or not via a sensing unit provided in the vehicle when a control command for opening the vehicle door is received after the vehicle stops, and, controlling the beam output unit so that information notifying the object approaching toward the vehicle door is irradiated to the road surface of the periphery of the vehicle door in a state in which the vehicle door is closed based on presence of the object approaching toward the vehicle door.

In an embodiment, when the object approaching toward the vehicle door is sensed via the sensing unit, the processor maintains the vehicle door in a state in which the vehicle door is closed regardless of the control command for opening the vehicle door.

In an embodiment, the processor opens the vehicle door according to the control command based on that the sensed object passes the vehicle door or the object approaching toward the vehicle door is not sensed.

In an embodiment, the processor outputs a first image guiding getting off of a passenger boarded on the vehicle to the road surface of the periphery of the vehicle door in a state in which the vehicle door is opened by the control command, and closes the vehicle door at a predetermined speed when the object approaching toward the vehicle door is sensed via the sensing unit.

In an embodiment, the processor changes a display mode of the first image output to a road surface of the periphery of the vehicle door while the vehicle door is closed at a predetermined speed.

In an embodiment, the first image includes a plurality of graphic objects, and the processor varies a color of at least one graphic object adjacent to the vehicle door side among the plurality of graphic objects.

In an embodiment, the processor controls the beam output unit such that information related to the object approaching toward the vehicle door is further irradiated to the road surface of the periphery of the vehicle door while the vehicle door is closed at the predetermined speed.

In an embodiment, the sensing unit senses a getting-off passenger present in the vehicle and a getting-on passenger present outside the vehicle, and the processor irradiates a first image to the road surface of the periphery of the vehicle door such that the getting-off passenger get off in a state in which the vehicle door opens, and controls the beam output unit such that a second image different from the first image is irradiated to the road surface of the periphery of the vehicle door so as for the getting-on passenger to get on after the getting off of the getting-off passenger is completed.

In an embodiment, when it is sensed that the getting-on passenger approaches toward the vehicle door in a state in which the first image is irradiated, or the getting-off passenger approaches toward the vehicle door in a state in which the second image is irradiated, the processor outputs warning information.

In an embodiment, the outputting of the warning information includes at least one of changing a color of the first image or the second image and outputting an additional image to the road surface of the periphery of the vehicle door.

In an embodiment, the sensing unit senses a getting-off passenger present in the vehicle and a getting-on passenger present outside the vehicle, and the processor determines a length of an image irradiated to the road surface of the periphery of the vehicle door, based on a number of getting-off passenger or a number of getting-on passenger.

In an embodiment, the processor controls the beam output unit such that the length of the image is shortened based on that the number of getting-off passenger present in the vehicle is decreased as the getting-off passenger gets off or the number of the getting-on passenger present outside the vehicle is decreased as the getting-on passenger gets on.

In an embodiment, the processor controls the beam output unit such that the length of the image is reduced as time passes.

In an embodiment, the vehicle control device further includes a communication unit configured to communicate with an external device present at a stop, wherein the processor is connected to communicate with the external device via the communication unit based on the vehicle entering the stop and receives location information for stopping the vehicle from the external device.

In an embodiment, the processor determines whether an obstacle of a predetermined type is present or not at a place corresponding to the location information via the sensing unit, outputs notification information notifying a stop location to the place corresponding to the location information when the obstacle of the predetermined type is not present in the place, and outputs the notification information notifying the stop location to a place different from the place corresponding to the location information when the obstacle of the predetermined type is present in the place.

In an embodiment, the processor senses whether a predetermined situation has occurred inside the vehicle via the sensing unit, and controls the beam output unit such that information notifying that the vehicle is not stopped at the stop is output to the road surface of the stop when the predetermined situation occurs inside the vehicle.

A vehicle according to an embodiment of the present invention includes a vehicle control device described the specification.

A control method of a vehicle including a vehicle control device according to an embodiment of the present invention includes sensing whether an object approaching toward the vehicle door is present or not when a control command for opening the vehicle door is received after the vehicle stops, and irradiating information notifying the object approaching toward the vehicle door to a road surface of a periphery of the vehicle door in a state in which the vehicle door is closed, based on the presence of the object approaching toward the vehicle door, In an embodiment, when the object approaching toward the vehicle door is sensed, the control method of the vehicle further includes maintaining the vehicle door in a state in which the vehicle door is closed regardless of the control command for opening the vehicle door.

In an embodiment, the control method of the vehicle further includes outputting a first image for guiding the getting off passenger boarded on the vehicle to the road surface of the periphery of the vehicle door in a state in which the vehicle door is opened by the control command, closing the vehicle door at a predetermined speed when the object approaching toward the vehicle door is sensed via a sensing unit, and changing a display mode of the first image irradiate to a road surface of the periphery of the vehicle door while the vehicle door is closed at a predetermined speed.

Specific aspects of other embodiments are included in the detailed description and the drawings.

Advantageous Effect

According to an embodiment of the present invention, there are one or to more of the following effects.

First, according to the present invention, when an object approaching toward a vehicle door at the moment when a user boarded on a vehicle needs to get off, information notifying the approaching object is irradiated to a road surface of the vehicle door without opening the vehicle door, and thus the present invention can prevent an accident.

Second, according to the present invention, when an object approaching toward the vehicle door is present in a state in which the vehicle door is open, a display mode of the image irradiated to a road surface is changed while the door is closed at a preset speed, and information related to the approaching object is irradiated to the road surface additionally, and thus a user who has got off in advance escapes to a safe area quickly, and a user who has not yet got off is prevented from getting off, thereby preventing an accident.

Third, according to the present invention, different information is irradiated to a road surface of a vehicle door side at the time of getting on and off, and thus it is possible to prevent a complicated situation that may occur when getting on and off and to induce a quick and safe getting on and off.

Fourth, according to the present invention, information that guides a location in which a vehicle will stop is irradiated to a road surface of a stop via communication with an external device provided at the stop, and a user who gets on the vehicle moves to the place in which the user gets on in advance, and thus it is possible to induce quick getting on and off and to prevent complexity that may occur at the bus stop.

Effects of the present invention are not limited to the above-described effects, and other effects not described will be clearly understood by those skilled in the art from the description of the claims.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
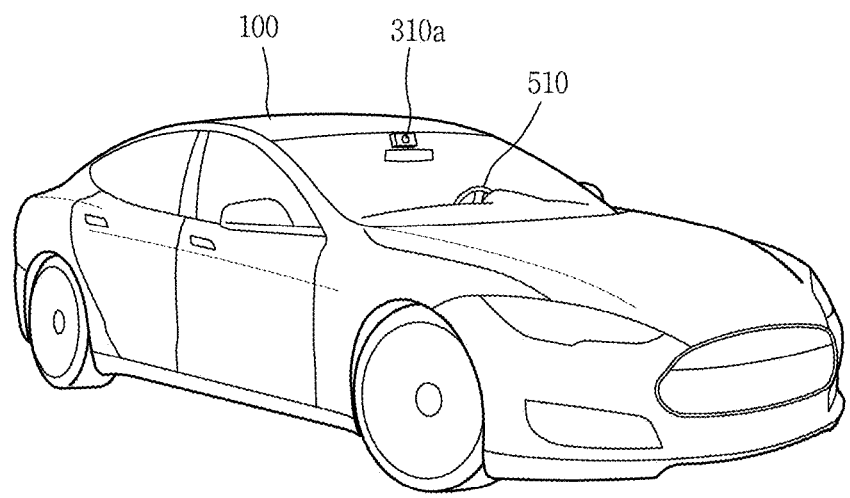
FIG. 1 is a view illustrating an appearance of a vehicle according to an embodiment of the present invention.
Figure 1:
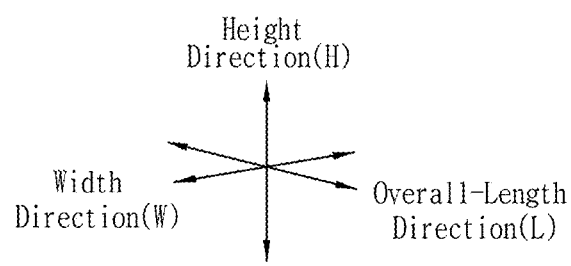

FIG. 1 is a view illustrating appearance of a vehicle in accordance with an embodiment of the present invention.

Figure 2:
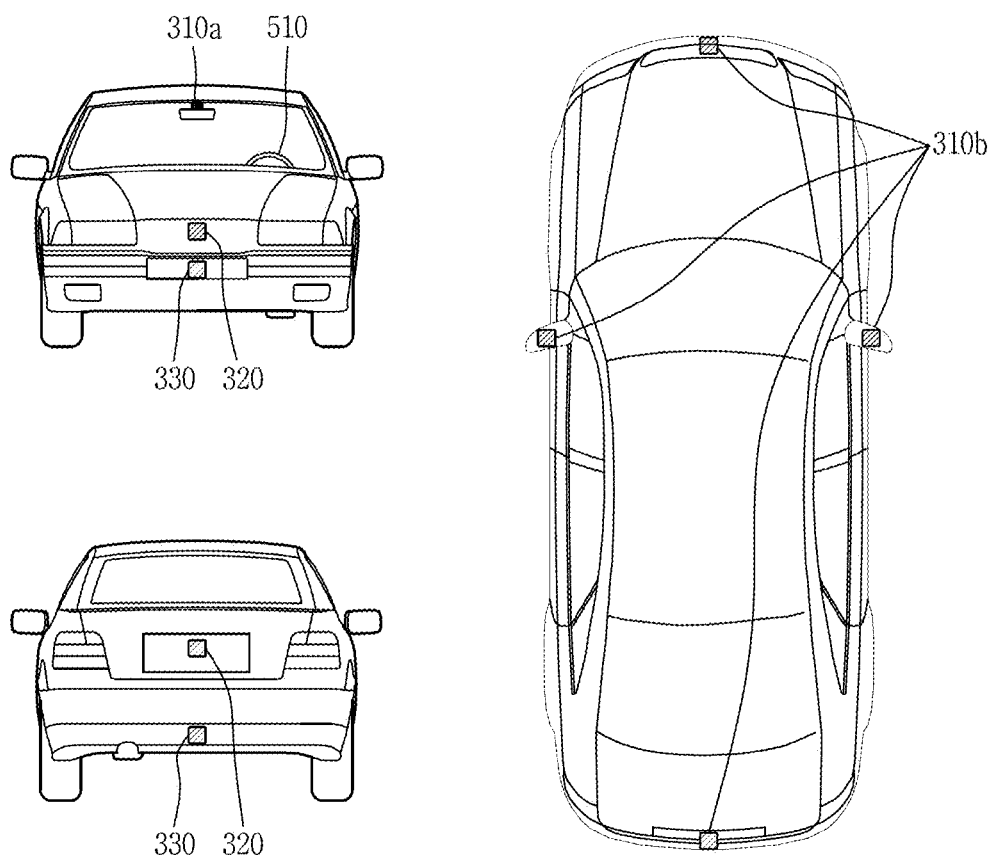
FIG. 2 is a view viewed from various angles outside a vehicle according to an embodiment of the present invention.

FIG. 2 is a view illustrating appearance of a vehicle at various angles in accordance with an embodiment of the present invention.

Figure 3:
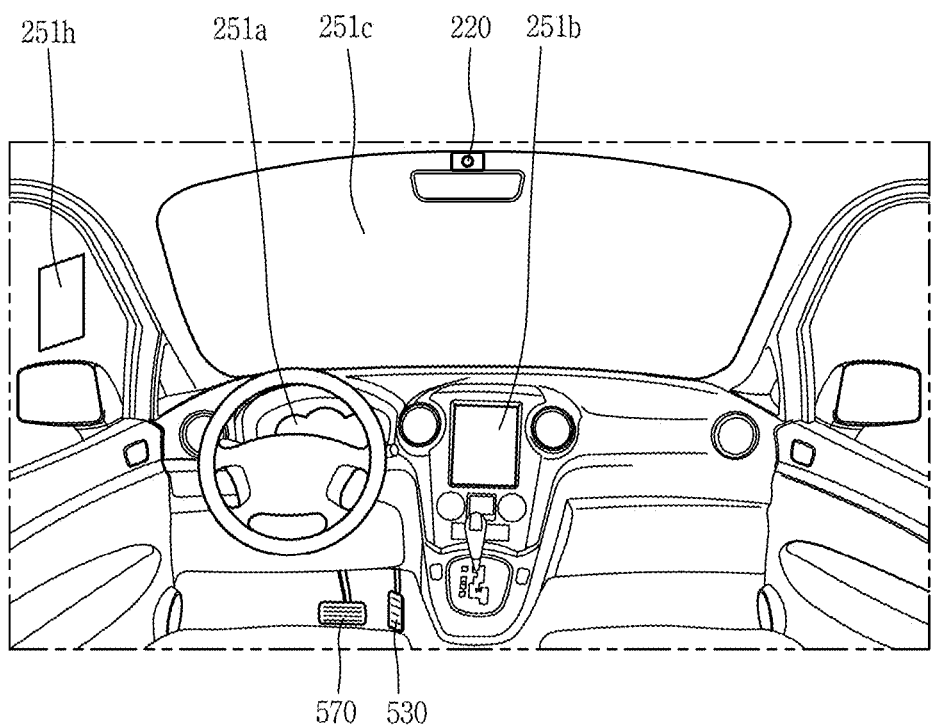
FIGS. 3 to 4 are views illustrating an inside of a vehicle according to an embodiment of the present invention.
Figure 4:
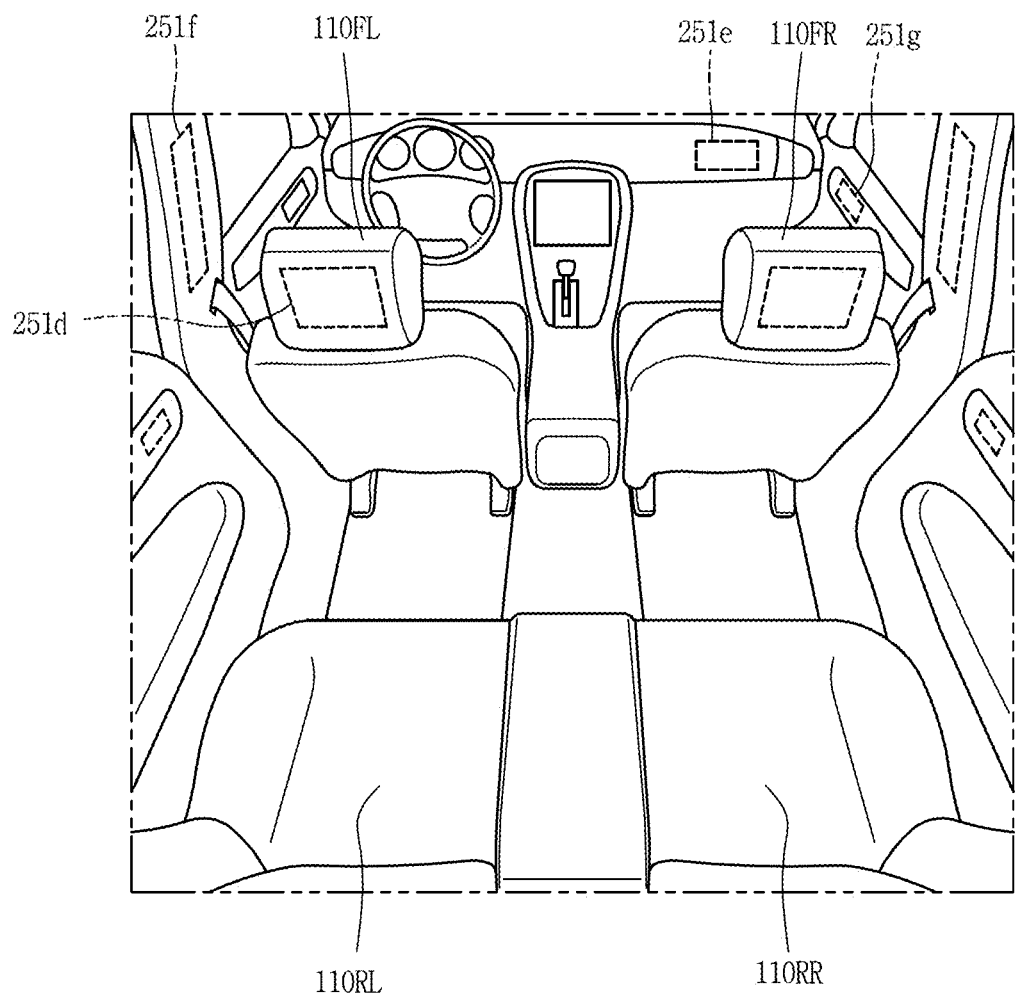

FIGS. 3 and 4 are views illustrating an inside of a vehicle in accordance with an embodiment of the present invention.

Figure 5:
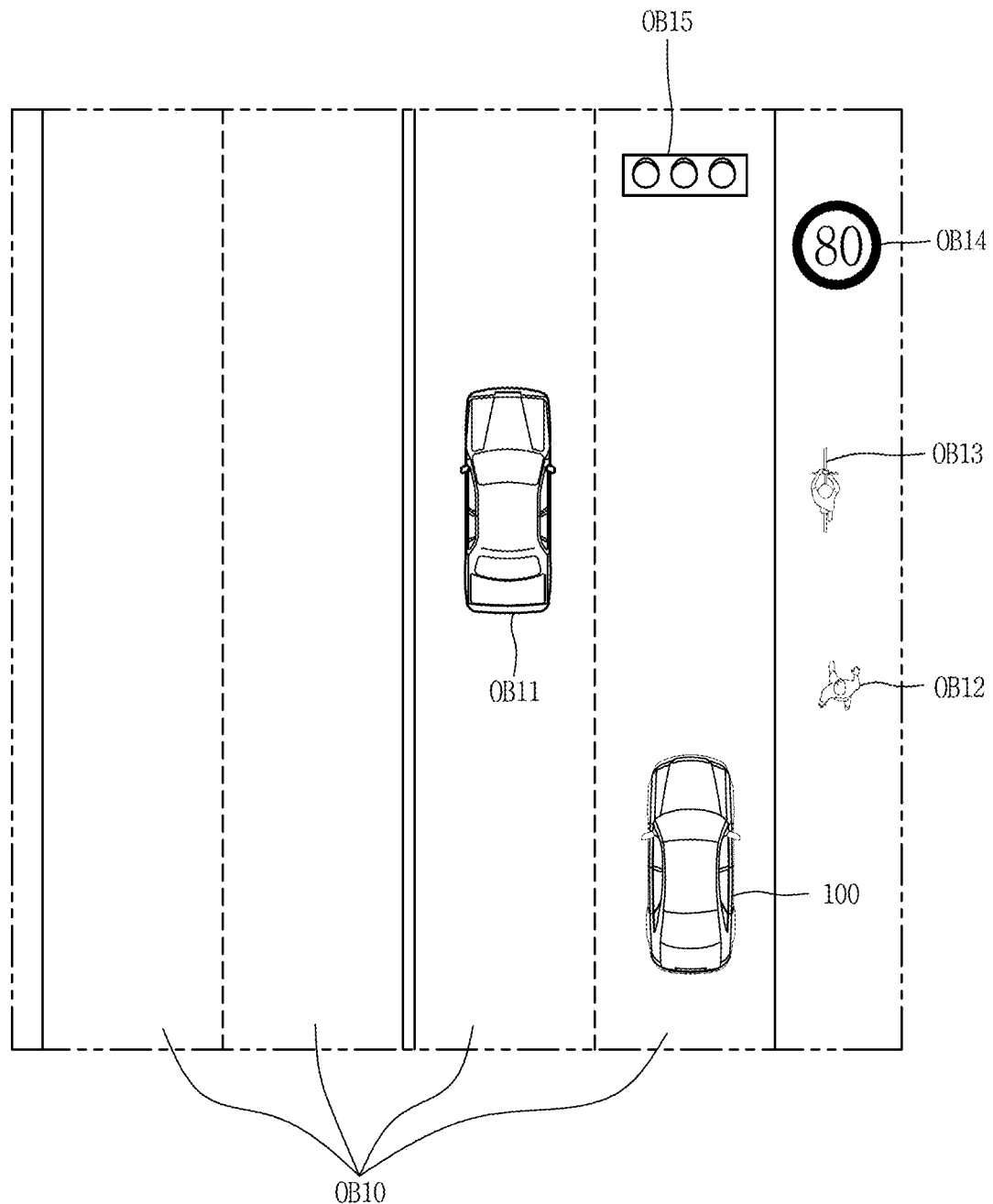
FIGS. 5 to 6 are reference views for describing objects according to an embodiment of the present invention.
Figure 6:
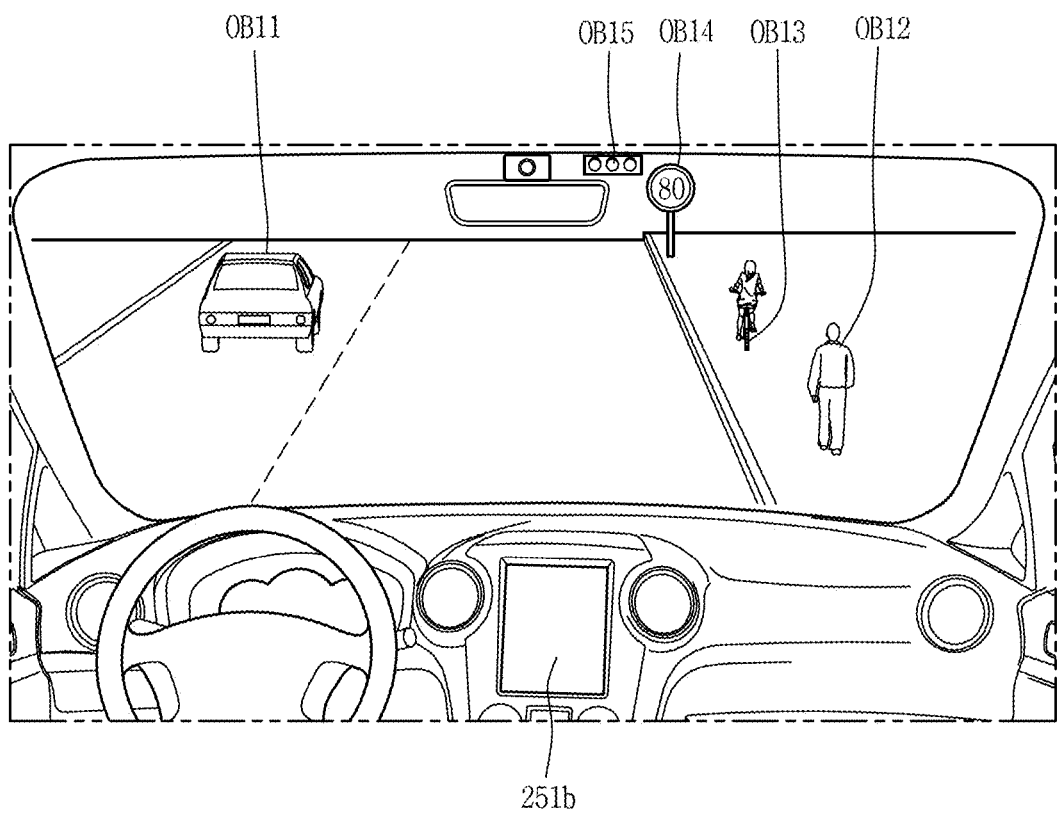

FIGS. 5 and 6 are reference views illustrating objects in accordance with an embodiment of the present invention.

Figure 7:
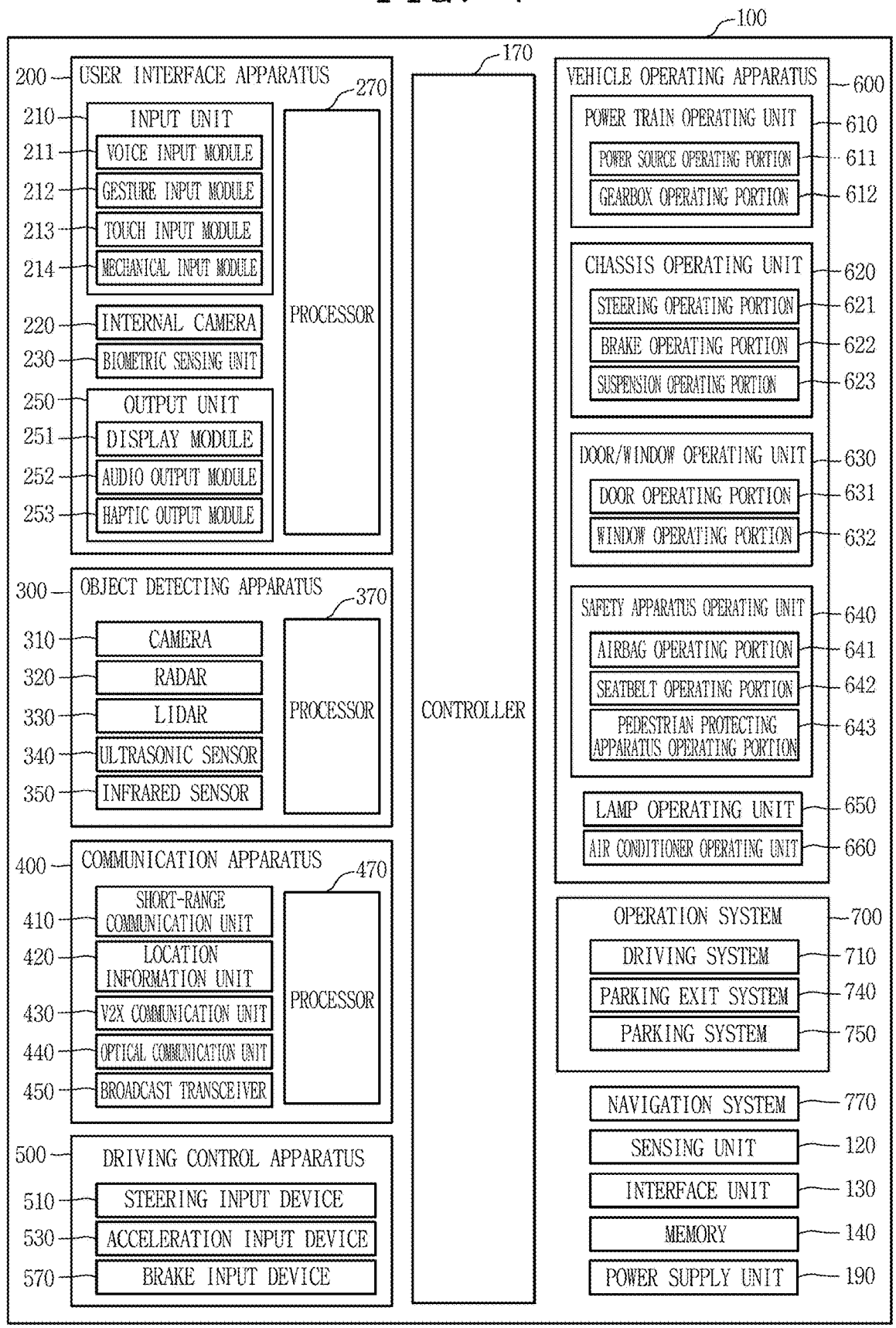
FIG. 7 is a block diagram for describing a vehicle according to an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering input device 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light-emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian.

The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Meanwhile, the vehicle control device 800 described herein may include all kinds of devices capable of controlling the vehicle, and may be, for example, a mobile terminal. When the vehicle control device 800 is a mobile terminal, the mobile terminal and the vehicle 100 may be connected to each other so as to perform communication in a wired/wireless manner. In addition, the mobile terminal may control the vehicle 100 in various ways in a communication-connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an embodiment of the present invention with reference to the accompanying drawings.

Figure 8:
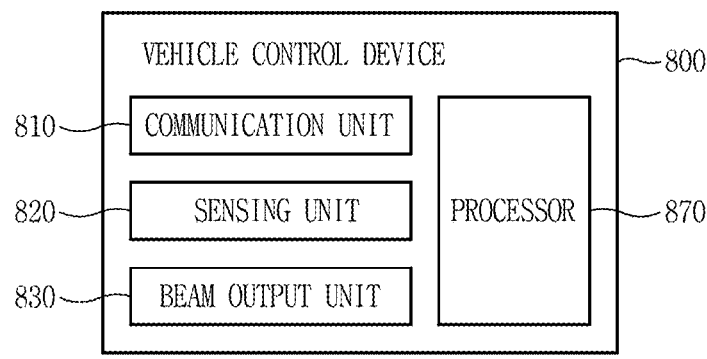
FIG. 8 is a conceptual diagram describing a vehicle control device according to an embodiment of the present invention.

FIG. 8 is a conceptual diagram describing a vehicle control device according to an embodiment of the present invention.

The vehicle control device 800 according to the present invention may include a communication unit 810, a sensing unit 820, a beam output unit 830, a processor 870, and the like.

First, the vehicle control device 800 according to the present invention may include a communication unit 810.

The communication unit 810 may be the above-described communication apparatus 400. The communication unit 810 may be connected to communicate with a mobile terminal present in the vehicle 100.

For example, the vehicle control device 800 (or the vehicle 100) and the mobile terminal may be connected to enable wireless communication via the communication unit 810. When the vehicle control device 800 and the mobile terminal are connected wirelessly to enable mutual wireless communication by a user request, or have been connected to enable wireless communication previously, based on the mobile terminal entering the vehicle, wireless connection may be performed to enable mutual wireless communication.

In addition, the communication unit 810 may be formed to communicate with an external device (for example, a digital signage, a server, a terminal, a computer, an infrastructure, etc.) present at a stop designated to stop the vehicle.

The communication unit 810 may be provided in a vehicle (or in a vehicle control device), or may be formed in a separate module form to enable communication (or electrical coupling) with components of the vehicle.

The vehicle control device 800 may control a mobile terminal or an external device via the communication unit 810.

In detail, the vehicle control device 800 may transmit a control signal for controlling the mobile terminal or the external device to the mobile terminal or the external device via the communication unit 810. When the control signal is received, the mobile terminal or the external device may perform a function/operation/control corresponding to the control signal.

On the other hand, the present invention may enable the mobile terminal to control the vehicle control device 800 (or the vehicle 100). In detail, the mobile terminal may transmit a control signal for controlling the vehicle to the vehicle control device 800. In response, the vehicle control device 800 may perform a function/operation/control corresponding to the control signal transmitted from the mobile terminal.

In addition, the communication unit 810 may perform communication with another vehicle.

The communication unit 810 may receive information related to a stop from an external device. The stop may include a place formed to stop the vehicle.

Further, the communication unit 810 may receive location information for the vehicle to be stopped from the external device.

For example, location information on which the vehicle stops may be determined by an external device. When the location information for stopping the vehicle is determined by the external device, the vehicle control device 800 may receive the location information for the vehicle to be stopped from the external device via the communication unit 810.

For example, the reception of such information may be performed by a control of the processor 870 or may be performed by a control of an external device.

Furthermore, the communication unit 810 may receive location information of the vehicle. The communication unit 810 may determine the current location of the vehicle via the location information unit 420 or the V2X communication unit 430.

In detail, the communication unit 810 may receive the current location information of the vehicle by using the GPS module included in the location information unit, or may receive the current location information from another vehicle or an external device (for example, infrastructure) via the V2X communication unit 430.

The vehicle control device 800 according to the present invention may include a sensing unit 820. The sensing unit 820 may be the object detecting device 300 described with reference to FIG. 7, or may be the sensing unit 120 provided in the vehicle 100.

The sensing unit 120 may include a camera. For example, the camera may include an internal camera configured to photograph an inside of the vehicle and an external camera configured to photograph an outside of the vehicle.

The sensing unit 120 may sense a gaze direction of a driver by using the internal camera. In addition, the sensing unit 120 may sense information (for example, a state of user, the number of users, an age of user, and the like) related to the user boarded in the vehicle by using the internal camera.

In addition, the sensing unit 120 may photograph the outside of the vehicle by using the external camera.

The sensing unit 120, by using the external camera, may sense presence of an object approaching toward the vehicle door, a type of the object, information related to the object, and information related to a user (for example, a state of user, the number of users, an age of user, and the like) who wants to board to the vehicle.

For example, the sensing unit 820 may be implemented in combination of at least two of a camera 310, a radar 320, a LiDAR 330, an ultrasonic sensor 340, an infrared sensor 350, and a sensing unit 120 included in the object detecting device 300.

The sensing unit 820 may sense information related to the vehicle 100 of the present invention.

The information related to the vehicle may be at least one of vehicle information (or driving state information of the vehicle) and periphery information of the vehicle.

For example, the vehicle information may include a driving speed of the vehicle, a weight of the vehicle, the number of occupants of the vehicle, a braking to force of the vehicle, a maximum braking force of the vehicle, a driving mode of the vehicle (whether autonomous driving or manual driving), a parking mode of the vehicle (autonomous parking mode, automatic parking mode, or manual parking mode), presence of a user in the vehicle, a state inside the vehicle and information related to the user (for example, whether the user is an authenticated user), or the like.

The periphery information of the vehicle may include, for example, a state of the road surface on which the vehicle is driving (friction force), weather, a distance from a vehicle in front (or rear), a relative speed of the vehicle in front (or rear), and a curvature of curve when driving lane is curved, brightness at a periphery of the vehicle, information related to an object present in a reference region (predetermined region) based on the vehicle, whether the object enters or leaves the predetermined region, presence of a user at a periphery of the vehicle, presence of an object approaching toward the vehicle, a type of the approaching object, information related to a user who is present near the vehicle and wants to board to the vehicle.

In addition, the periphery information (or periphery environment information) of the vehicle may include external information of the vehicle (for example, the ambient brightness, temperature, sun location, information on periphery objects (people, other vehicles, sign board, etc.), a type of driving road surface, features, line information and lane information), and information necessary for autonomous driving/autonomous parking/automatic parking/manual parking mode.

The periphery information of the vehicle may further include a distance between an object (object) present at a periphery of the vehicle and the vehicle 100, a type of the object, a parking space where the vehicle can park, and an object (for example, parking lines, ropes, other vehicles, walls, etc.) for identifying a parking space.

Information related to the vehicle sensed via the sensing unit 820 may be used in an autonomous driving mode for autonomous driving of the vehicle. In detail, the processor 870 may drive the vehicle autonomously by using information related to the vehicle sensed via the sensing unit 820.

The function/operation/control method performed at the sensing unit 820 may be performed by the sensing unit 120 (or the object detecting device 300) of the vehicle. The sensing unit 120 may include the object detecting device 300.

In the present specification, for convenience of description, it will be described that information related to the vehicle is sensed via the sensing unit 120 provided in the vehicle. However, the present invention is not limited thereto, and all types of information sensed via the sensing unit 120 may be sensed by the sensing unit 820 of the vehicle control device 800, and the vehicle control device 800 may perform the function/operation/control method described herein by using the information sensed by the sensing unit 820.

In addition, the vehicle control device 800 according to the present invention may include a beam output unit 830.

The beam output unit 830 may be formed to radiate light to a road surface of a periphery of a vehicle. For example, the beam output unit 830 may be formed to output light to a road surface of a periphery of a vehicle door (or a predetermined region of the road surface adjacent to the vehicle door).

The beam output unit 830 may be named as a projector or a lamp in terms of outputting light.

The light emitted to the road surface of a periphery of the vehicle from the beam output unit 830 may have a predetermined shape or form a meaningful figure, color, pattern, text, image, graphic object, or the like.

From this point of view, the light irradiating from the beam output unit 830 to the road surface of the periphery of the vehicle may be understood as information, and the information may include figures, colors, patterns, text, images, graphic objects, and the like.

The beam output unit 830 may include various kinds of light sources for irradiating light (information) to the road surface of the periphery of the vehicle, and may include all kinds of light sources for identifying light irradiated to the road surface of the periphery of the vehicle.

The beam output unit 830 may irradiate light (information) to a region within a predetermined distance with respect to the vehicle. The range of the predetermined distance may be determined by the kinds of light source forming the beam output unit 830 or may be determined/changed by a user setting.

The beam output unit 830 may be provided at an outer surface of the vehicle to irradiate light to the outside of the vehicle. For example, the beam output unit 830 may be installed at the vehicle door (or at a periphery of the vehicle door) to irradiate light (information) to the road surface of the periphery of the vehicle door or provided at the front of the vehicle to irradiate light (information) to the road surface of the stop.

The place where the beam output unit 830 is provided is not limited, and the beam output unit 830 may be installed at any place as long as the beam output unit 830 can irradiate light to a road surface outside the vehicle.

In addition, the vehicle control device 800 of the present invention may include a processor 870 capable of controlling the communication unit 810, the sensing unit 820, the beam output unit 830, and the like.

The processor 870 may be the controller 170 described with reference to FIG. 7.

The processor 870 may control the components described with reference to FIG. 7 and the components described with reference to FIG. 8.

Meanwhile, the vehicle control device according to the present invention may include a communication unit 810, a sensor controller (not illustrated), and a beam controller (not illustrated).

The communication unit 810 communicates with at least one of the sensing unit 820 and the beam output unit 830 provided in the vehicle. That is, at least one of the sensing unit 820 and the beam output unit 830 may not be provided in the vehicle control device 800, but may be installed at the vehicle as a separate device independent of the vehicle control device 800.

In response to an event that the vehicle door is opened occurring or being expected to occur, the sensor controller communicates with the sensing unit 820 via the communication unit 810 to sense an object approaching toward the vehicle door.

The event refers that at least one of the plurality of doors provided in the vehicle is switched from a closed state to an open state.

The sensor controller may determine a situation in which the event is expected to occur based on vehicle driving information of the vehicle. For example, when the vehicle speed is reduced and the stop is expected, and when the vehicle enters a service area or stop, the sensor controller may determine a situation in which the event is expected to occur.

When an object exists toward the vehicle door, the beam controller controls the beam output unit via the communication unit so that information notifying an object approaching toward the vehicle door is irradiated to the road surface of the periphery of the vehicle door in a state in which the vehicle door is closed.

The sensor controller and the beam controller may be formed inside the processor 870. In other words, the processor 870 may perform at least one function of the sensor controller and the beam controller.

Hereinafter, a method of guiding a safe getting on and off in a situation in which the vehicle in the present invention is stopped will be described in detail with reference to the accompanying drawings.

The vehicle of the present invention may include all kinds of transportation means that users can get on and off such as taxis, buses, subways, trams, and trains.

Figure 9:
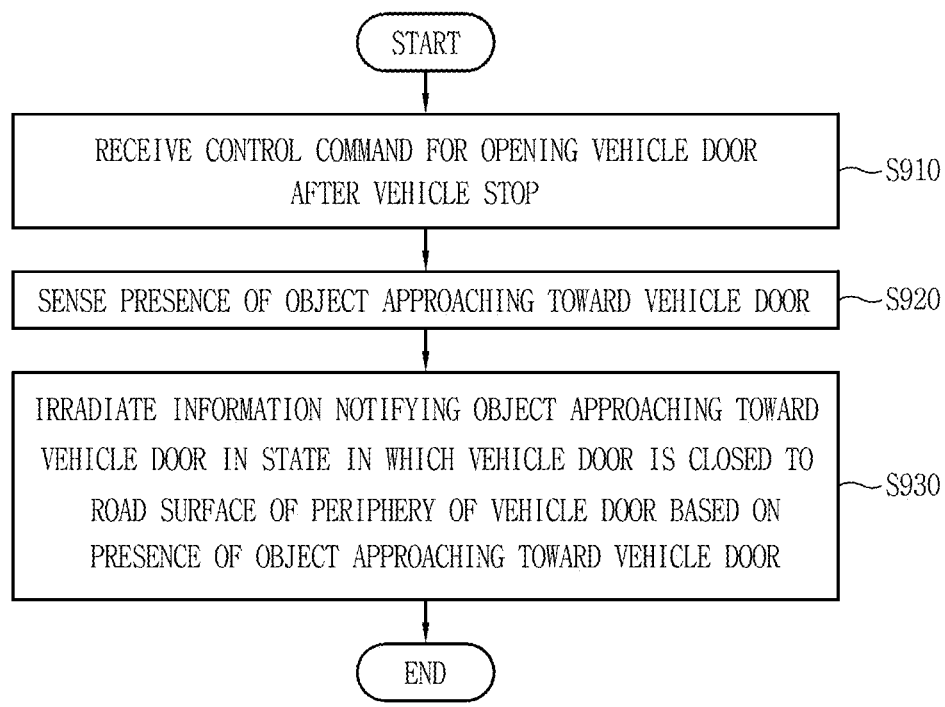
FIG. 9 is a flowchart for describing a representative control method of the present invention.
Figure 10:
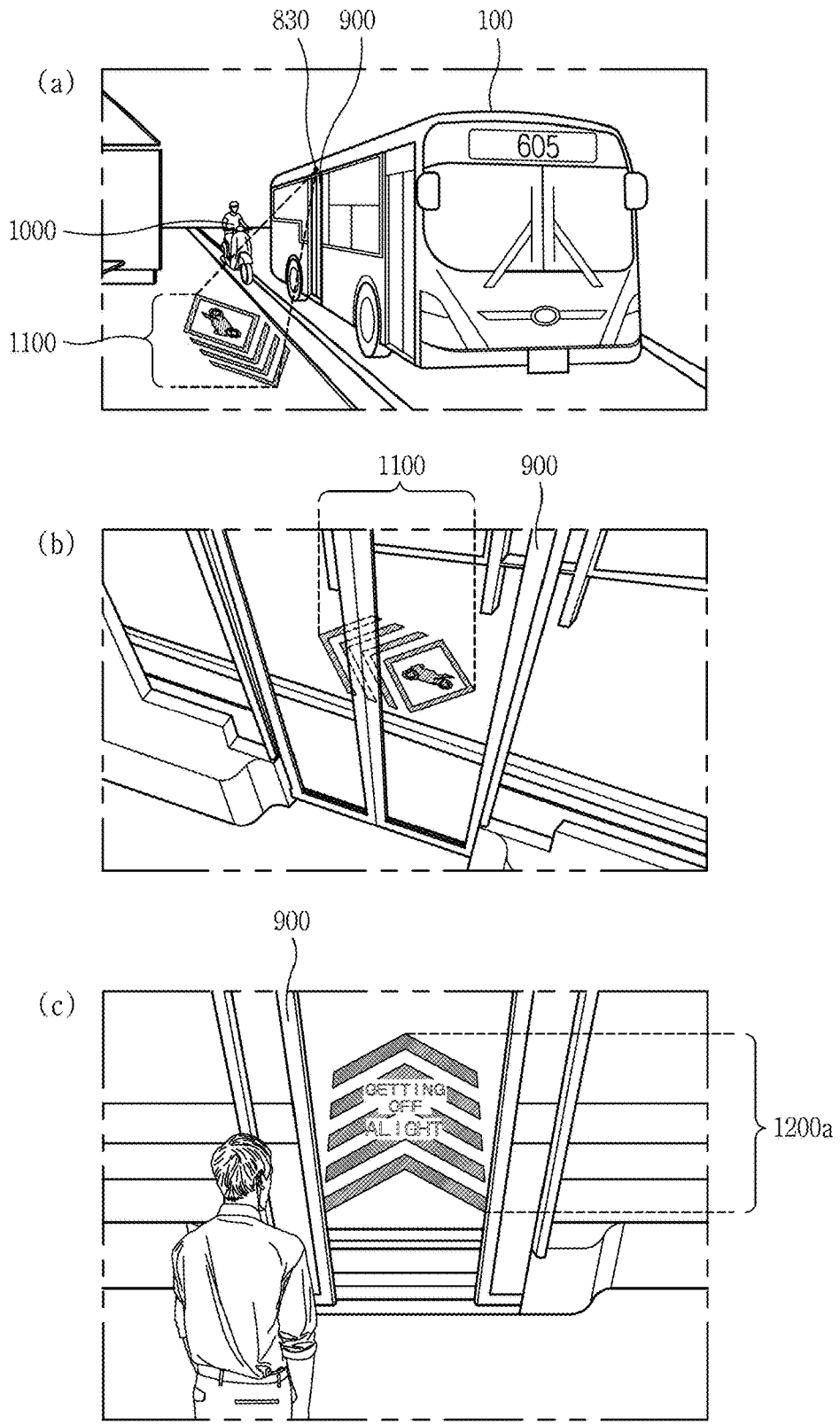
FIG. 10 is a conceptual view for describing the control method described with reference to FIG. 9.

FIG. 9 is a flowchart for describing a representative control method of the present invention, and FIG. 10 is a conceptual view for describing the control method described with reference to FIG. 9.

First, the processor 870 may sense information related to a vehicle via the sensing unit 120 provided in the vehicle. The processor 870 may sense information related to the vehicle in a predetermined state.

For example, the predetermined state may include a state in which the vehicle is driving, a state in which the vehicle is stopped, a state in which the vehicle enters a place (for example, a stop) formed to stop, etc. and may be predetermined, or added/deleted/changed by the user.

Sensing information related to the vehicle may be performed via the sensing unit 120 or the sensing unit 820 of the vehicle control device 800 provided in the vehicle.

Referring to FIG. 9, in the present invention, a step of receiving a control command for opening a vehicle door after the vehicle 100 stops is performed (S910).

Then, in the present invention, a step of sensing whether an object approaching toward the vehicle door is present or not is performed (S920).

In detail, when the control command for opening the vehicle door is received after the vehicle 100 stops, the processor 870 may sense whether an object approaching toward the vehicle door is present or not via the sensing unit 120.

The control command for opening the vehicle door may be generated (received) by receiving a user request (or user operation) for opening the vehicle door, pressing a button formed to open the vehicle door, or operating a handle for opening the vehicle door.

In addition, when the vehicle 100 is in an autonomous driving mode, the control command for opening the vehicle door may be generated (received) based on satisfying a predetermined condition formed to open the vehicle door in a state in which the vehicle is stopped.

Here, the predetermined condition may include, for example, a case in which the vehicle is stopped, a case in which the vehicle stops after entering the stop, a case in which a parking of the vehicle is completed, a case in which the vehicle is turned off, and the like, and may be determined/changed by a user setting.

The control command for opening the vehicle door may be generated by a separate processor provided in the vehicle door or the controller 170 of the vehicle, and received by the processor 870 based on the above-described situations.

Then, in the present invention, based on the presence of the object approaching toward the vehicle door, a step of irradiating information notifying the object approaching toward the vehicle door to the road surface of the periphery of the vehicle door in a state in which the vehicle door is closed is performed (S930).

In detail, the processor 870 may control the beam output unit 830 so that the information notifying the object approaching toward the vehicle door is irradiated to the road surface of the periphery of the vehicle door in a state in which the vehicle door is closed based on the presence of the object approaching toward the vehicle door, For example, as shown in (a) of FIG. 10, when a control command for opening a vehicle door 900 is received after the vehicle 100 stops, the processor 870 may sense whether an object 1000 approaching toward the vehicle door 900 is present or not via the sensing unit 120 provided in the vehicle 100.

For example, when the control command for opening the vehicle door 900 is received in the stopped state after entering the place (for example, the stop) formed to stop the vehicle 100, the processor 870 may sense whether the object 1000 approaching toward the vehicle door 900 is present or not via the sensing unit 120 provided in the vehicle 100.

When the object 1000 approaching toward the vehicle door 900 is present, the processor 870 may sense the information related to the object 1000 (for example, the type of object, the number of objects, the speed of the object, etc.) via the sensing unit 120.

In addition, as shown in (b) FIG. 10, the processor 870 may control the beam output unit 830 so that based on the presence of the object 1000 approaching toward the vehicle door 900, information 1100 notifying an object approaching toward the vehicle door 900 in a state in which the vehicle door 900 is closed is irradiated to the road surface of the periphery of the vehicle door 900 (that is, the road surface of the periphery of the vehicle door 900 in which a control command for opening the vehicle door is received among the road surfaces outside the vehicle).

The road surface of the periphery of the vehicle door 900 may refer to a predetermined region adjacent to the vehicle door 900 or a region within a predetermined distance based on the vehicle door 900.

That is, when a control command for opening the vehicle door 900 is received in a state in which the vehicle is stopped, the processor 870 may sense whether an object approaching toward the vehicle door 900 is present or not via the sensing unit 120 instead of opening the vehicle door 900 to be opened by the control command immediately.

Then, when an object approaching toward the vehicle door 900 to be opened by the control command is present, in a state in which the vehicle door 900 is closed, the processor 870 may irradiate the information 1100 notifying an object approaching toward the vehicle door 900 to the road surface of the periphery of the vehicle door 900 by using the beam output unit 830.

When the object approaching toward the vehicle door 900 is sensed via the sensing unit 120, the processor 870 may maintain the vehicle door 900 in a state in which the vehicle door 900 is closed regardless of a control command for opening the vehicle door 900.

The processor 870 may irradiate the information 1100 notifying an object approaching toward the vehicle door 900 to the road surface of the periphery of the vehicle door 900 while the vehicle door 900 maintains in a state in which the vehicle door 900 is closed.

The information 1100 notifying an object approaching toward the vehicle door 900 may be formed in various forms, and different information according to the type of the object approaching toward the vehicle door 900 may be irradiated to the road surface of the periphery of the vehicle door 900.

For example, when the type of the object approaching toward the vehicle door 900 is a first type of object (for example, a motorcycle), the information 1100 may include first information notifying the first type of object. When the type of the object approaching toward the vehicle door 900 is a second type of object different from the first type (for example, a vehicle), the information 1100 may include second information notifying the second type of object.

Then, as shown in (c) of FIG. 10, based on the sensed object 1000 passing the vehicle door 900 or the object approaching toward the vehicle door not sensed, the processor 870 may open the vehicle door 900 according to a control command for opening the vehicle door.

In addition, when the vehicle door is opened, the processor 870 may control the beam output unit 830 so that a first image 1200a for guiding the getting off of a user (getting-off passenger) boarded on the vehicle is irradiated to the road surface of the periphery of the vehicle door 900.

That is, the processor 870 may output the information 1100 notifying an object approaching toward the vehicle door in a state in which the vehicle door is closed, and when the vehicle door is opened, the output of the information 1100 may be stopped and the first image 1200a may be output to the road surface of the periphery of the vehicle door 900.

With such configuration, when an object approaching toward the vehicle door in a state in which the vehicle door is being opened is present, a state in which the vehicle door is closed is maintained, and information notifying the object approaching toward the vehicle door is irradiated to the road surface of the periphery of the vehicle door, and thus the present invention has the effect that an accident that may occur at the timing of getting off can be prevented.

Hereinafter, a method of guiding safer getting on and off of the present invention will be described in more detail with reference to the accompanying drawings.

FIGS. 11, 12, 13, 14, 15, 16, and 17 are conceptual views for describing various embodiments of the present invention.

Figure 11:
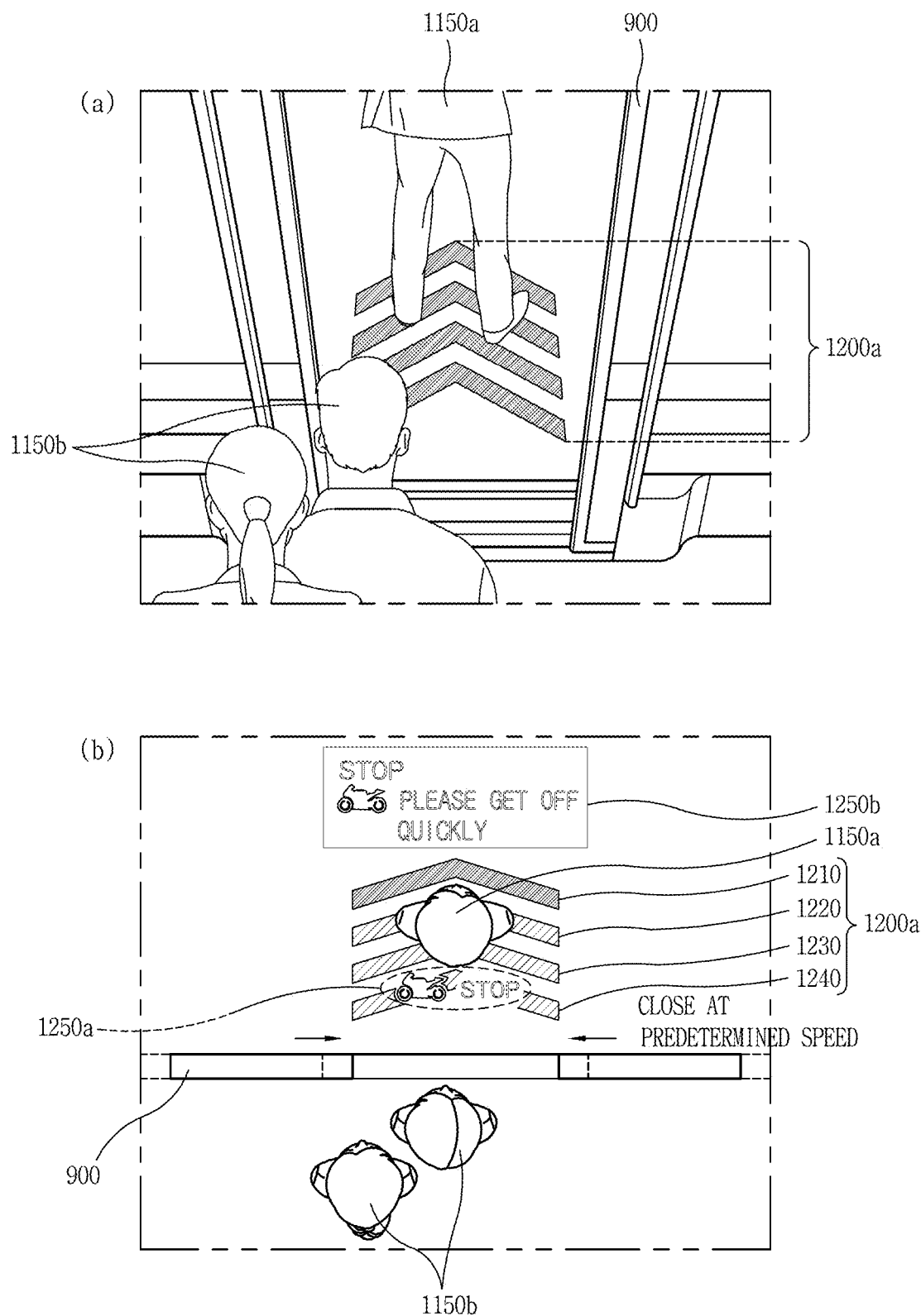
FIGS. 11, 12, 13, 14, 15, 16, and 17 are conceptual views for describing various embodiments of the present invention.

As shown in (a) of FIG. 11, the processor 870 may output the first image 1200a for guiding the getting off passengers 1150a and 1150b boarded on the vehicle 100 in a state in which the vehicle door 900 is opened by a control command for opening the vehicle door to the road surface of the periphery of the vehicle door 900.

At this point, as shown in (b) of FIG. 11, when the object approaching toward the vehicle door 900 is sensed via the sensing unit 120, the processor 870 may close the vehicle door 900 at a predetermined speed.

In detail, when the object approaching toward vehicle door 900 is sensed via the sensing unit 120 in a state in which the vehicle door 900 is open, the processor 870 may close the opened vehicle door 900 at a predetermined speed.

At this point, the predetermined speed may be a predetermined speed or less so that the getting-off passenger who is getting off is not injured by the closing door. In addition, the predetermined speed may be a predetermined speed or more so that the getting-off passenger who is getting off recognizes that the door is closed and stops the getting off. For example, the predetermined speed may be any one speed of the predetermined speed or more and the predetermined speed or less.

Further, as shown in (b) of FIG. 11, while the vehicle door 900 is closed at a predetermined speed, the processor 870 may change an displaymode of the first image 1200a being output (irradiated) to the road surface of the periphery of the vehicle door.

For example, the first image 1200a may include a plurality of graphic objects 1210, 1220, 1230, and 1240, as shown in (b) of FIG. 11.

The processor 870 may vary a color of at least one of graphic objects 1220, 1230, and 1240 adjacent to the vehicle door 900 among the plurality of graphic objects 1210, 1220, 1230, and 1240 while the vehicle door 900 is closed at a predetermined speed.

The at least one of graphic objects 1220, 1230, and 1240 adjacent to (or near) the vehicle door 900 may be determined in various manners, and for example, may be determined based on the last getting-off passenger 1150a who has boarded on the vehicle and then got off.

For example, the processor 870 may determine the graphic object(s) adjacent to the vehicle from a point at which the getting-off passenger 1150a is located among the plurality of graphic objects 1210, 1220, 1230, and 1240 as the at least one of graphic objects 1220, 1230, and 1240 varying the color.

In this case, when a location of the getting-off passenger 1150*a* becomes farther from the vehicle, the number of the at least one of graphic objects 1220, 1230, and 1240 varying colors may be increased according to the location of the getting-off passenger 1150*a*.

When the colors of the plurality of graphic objects included in the first image 1200*a* are output in a first color (for example, green color) for inducing getting off, and the object approaching toward the vehicle door 900 is sensed, the processor 870 may change a color of at least one of graphic objects 1220, 1230, and 1240 adjacent to the vehicle among the plurality of graphic objects to a second color (for example, red color) for inducing a stop of getting off.

In addition, the processor 870 may control the beam output unit 830 so that information 1250*a* and 1250*b* related to the object approaching toward the vehicle door 900 is further irradiated to the road surface of the periphery of the vehicle door 900 while the vehicle door 900 is being closed at a predetermined speed.

For example, the information 1250*a* and 1250*b* related to the object may include information 1250*a* notifying an object approaching toward the vehicle door to the getting-off passenger 1150*b* that has not yet got off from the vehicle, and information 1250*b* for inducing fast movement of the getting-off passenger 1150*a* that has got off the vehicle.

With such configuration, when the object approaching toward the vehicle door is further sensed in a state in which the vehicle door is open, the getting-off passenger who has already gotten off is induced to move fast and the getting-off passenger who has not got off stops the getting off, and thus the present invention has the effect that an accident occurrence rate can be reduced.

Meanwhile, the processor 870 may sense a getting-off passenger (or passenger scheduled to get off) 1260 present in the vehicle by using the sensing unit 120 or 820, and may sense a getting-on passenger (or passenger scheduled to get on) 1270 present outside the vehicle.

Figure 12:
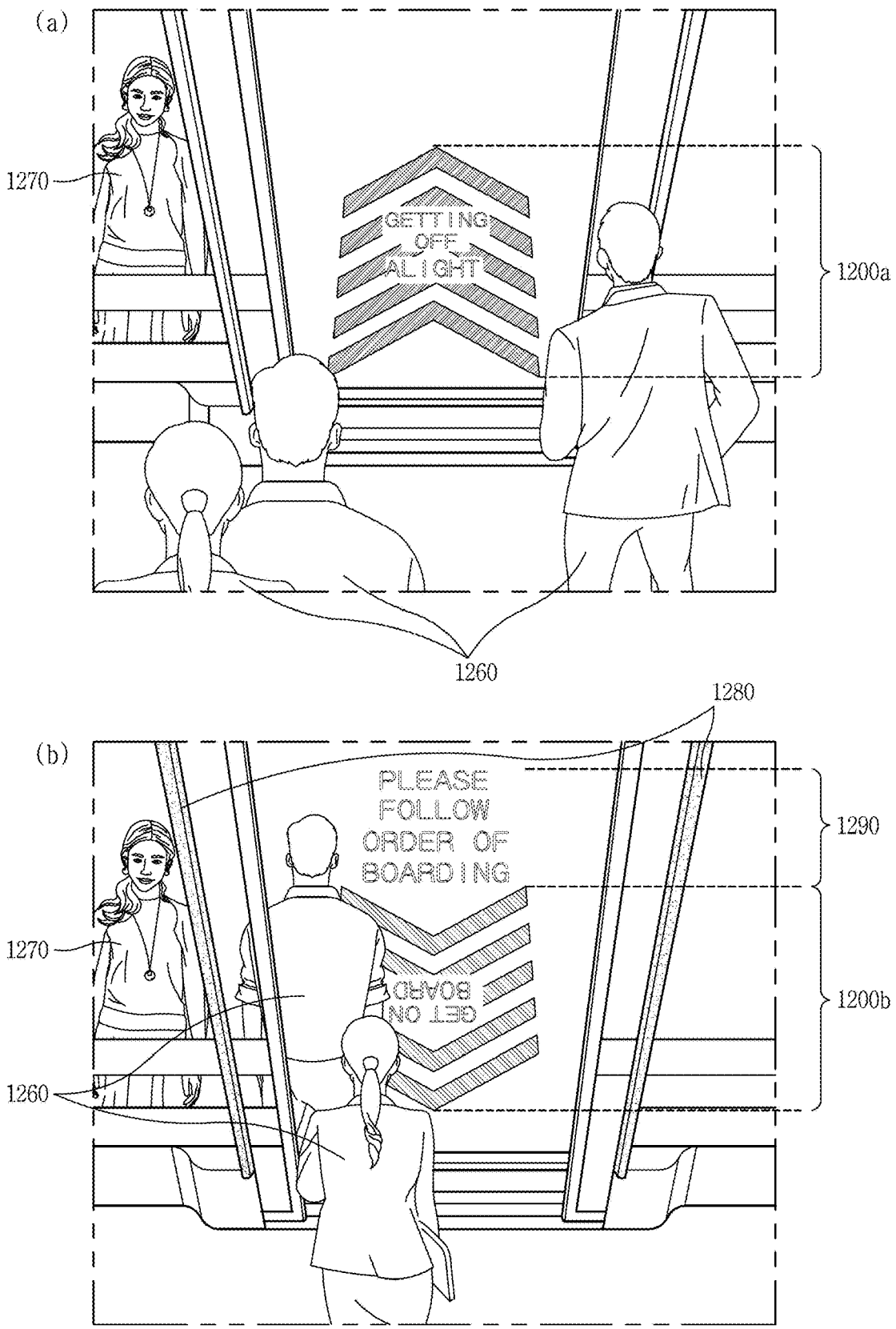

For example, as shown in (a) of FIG. 12, the processor 870 may sense (determine) a user present within a predetermined region from the vehicle door 900 among the users present in the vehicle, as the getting-off passenger 1260.

In addition, the processor 870 may sense (determine) a user present within a predetermined region from the vehicle door 900 among the users present outside the vehicle, as the getting-on passenger 1270.

As shown in (a) of FIG. 12, the processor 870 may irradiate (output) the first image 1200*a* to the road surface of the periphery of the vehicle door 900 so that the getting-off passenger 1260 gets off in a state in which the vehicle door 900 is open.

In addition, as shown in (b) of FIG. 12, the processor 870 may control the beam output unit 830 so that a second image 1200*b* different from the first image 1200*a* is irradiated to the road surface of the periphery of the vehicle door 900 so that the getting-on passenger 1270 gets on after the getting off of the getting-off passenger 1260 is completed.

As another example, the processor 870 may stop the output of the first image 1200*a* based on passing of a predetermined time after the first image 1200*a* is irradiated to the road surface of the periphery of the vehicle door 900 and radiate the second image 1200*b* to the road surface of the periphery of the vehicle door 900.

The first image 1200*a* may be an image formed to induce the getting off of the getting-off passenger 1260, and the second image 1200*b* may be an image formed to induce the getting on of the getting-on passenger 1270.

Meanwhile, when it is sensed that the getting-on passenger 1270 approaches toward the vehicle door 900 in a state in which the first image 1200*a* (that is, the image formed to induce getting off) is irradiated to the road surface of the periphery of the vehicle door, or that the getting-off passenger 1260 approaches toward the vehicle door 900 in a state in which the second image 1200*b* (for example, the image formed to induce getting on) is irradiated to the road surface of the periphery of the vehicle door, the processor 870 may output warning information.

For example, as shown in (b) of FIG. 12, in the state in which the second image 1200*b* is being output, when a getting-off passenger present in the vehicle approaches toward the vehicle door or gets off through the vehicle door, the processor 870 may output warning information 1290.

The outputting of the warning information may include at least one of changing the color of the first image 1200*a* or the second image 1200*b*, and outputting additional images (for example, "Please follow the order of boarding" illustrated in (b) of FIG. 12) to the road surface of the periphery of the vehicle door.

Further, the outputting of the warning information may include, for example, emitting a light emitting unit (or a lamp or a warning light) 1280 installed at the periphery of the vehicle door 900.

Although not illustrated, in the state in which the first image 1200*a* formed to induce the getting off of the getting-off passenger is irradiated, when the getting on of the getting-on passenger 1270 is detected or the getting-on passenger 1270 approaching toward the vehicle door 900 is detected, the processor 870 may output warning information.

Meanwhile, the processor 870 may sense the getting-off passenger present in the vehicle and sense the getting-on passenger present outside the vehicle via the sensing unit 120 or 820.

At this point, the processor 870 may determine the length of the image irradiated to the road surface of the periphery of the vehicle door 900 (or the number of the plurality of graphic objects included in the image) based on the number of getting-off passengers or the number of getting-on passengers.

Figure 13:
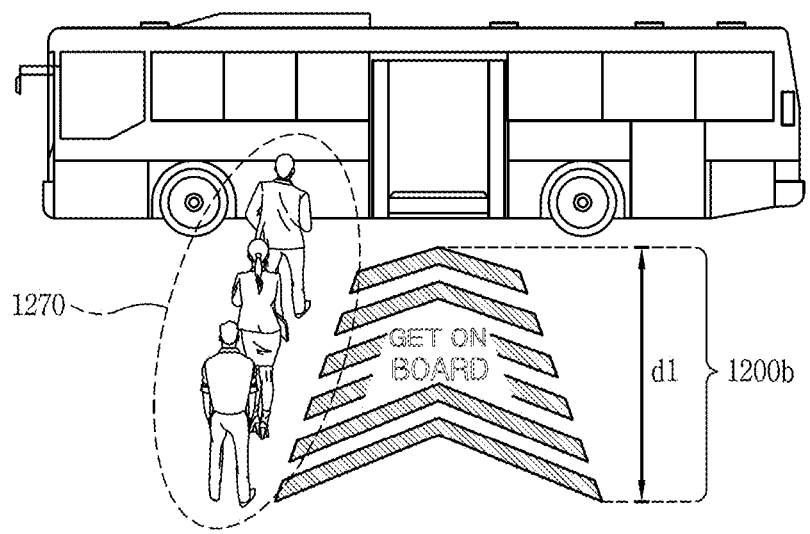
Figure 13:
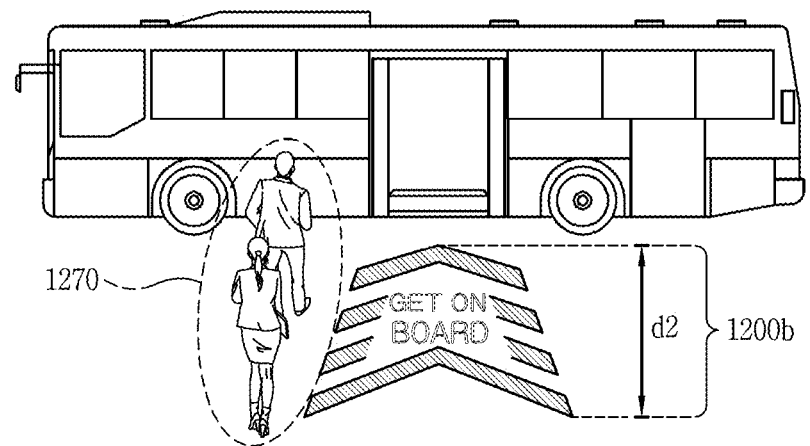
Figure 13:
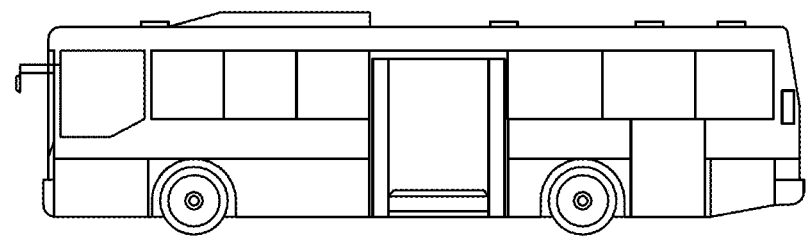

For example, as shown in (a) of FIG. 13, the processor 870 may determine the number of getting-on passengers 1270 to be boarded on the vehicle via the sensing unit 120.

Then, the processor 870 may determine the length of the image irradiated to the road surface of the periphery of the vehicle door by a length corresponding to the determined number of getting-on passengers.

In addition, the processor 870 may control the beam output unit 830 so that the length of the image shortens (or the number of the plurality of graphic objects included in the image is reduced) based on the decrease in the number of getting-off passengers present in the vehicle as the getting-off passenger gets off, or the decrease in the number of getting-on passengers present outside the vehicle as the getting-on passenger gets on.

For example, as shown in (a) of FIG. 13, when the number of getting-on passengers is n persons (for example, three persons), the beam output unit 830 may be controlled such that the image, (for example, the second image 1200*b*) is irradiated to the road surface of the periphery of the vehicle door by a first length d1 corresponding to the n persons.

Then, as shown in (b) of FIG. 13, when the number of getting-on passengers present outside the vehicle decreases from n person to m person (for example, 2 persons) less than n person, as the getting-on passenger gets on, the processor 870 may control the beam output unit 830 so that the image 1200b is irradiated to the road surface of the periphery of the vehicle door by a second length (second length shorter than the first length) d2 corresponding to the m person.

Then, when the passenger is not present outside the vehicle as all of getting-on passengers board, the processor 870 may stop the output of the image 1200b.

Further, although not illustrated, the processor 870 may stop the output of the image (information) irradiated to the road surface of the periphery of the vehicle door based on the closing of the vehicle door according to a control command for closing the vehicle door in a state in which the first image 1200a or the second image 1200b is being output.

Furthermore, although not illustrated, the processor 870 may control the beam output unit 830 so that the length of the image (the first image 1200a or second image 1200b) decreases as time passes.

For example, the processor 870 may output the image to the road surface of the periphery of the vehicle door by the first length for a first time after the image is outputted and output the image to the road surface of the periphery of the vehicle door by the second length shorter than the first length until a second time after the first time as time passes.

Then, the processor 870 may stop the output of the image and close the vehicle door based on reaching a third time after the second time.

With such configuration, the present invention may provide a vehicle control device capable of inducing the getting on or off of the getting-on or -off passenger intuitively, and a control method thereof.

Meanwhile, the vehicle control device 800 of the present invention may further include a communication unit 810 formed to enable communication with an external device present at a stop.

Figure 14:
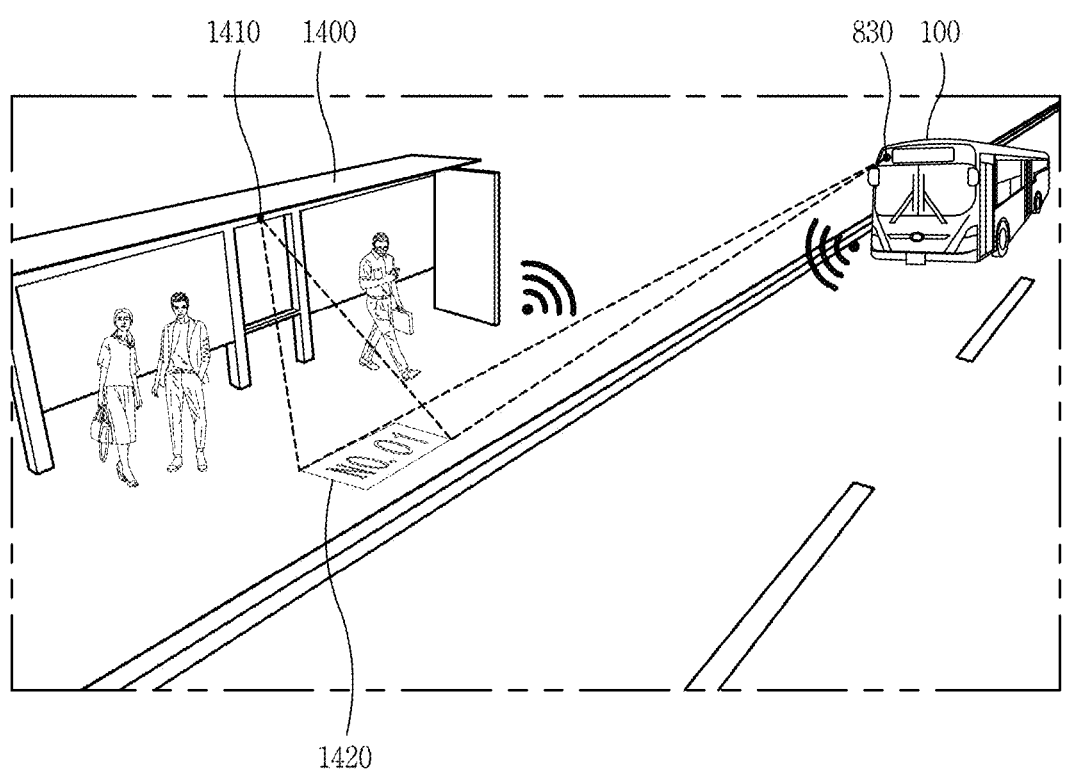

As shown in FIG. 14, the processor 870 may communicate with an external device 1410 provided at a stop 1400 formed to stop the vehicle 100 via the communication unit 810. For this, the external device 1410 may include a communication unit.

The external device 1410 may include all types of devices that can communicate with each other, and for example, the external device 1410 may be a digital signage (or a signage).

The external device 1410 may include a sensing unit (for example, a camera), and sense information (for example, the number of users, the state of the user, the age of the user, etc.) related to a user (for example, a passenger) present at the stop 1400 via the sensing unit.

In addition, the external device 1410 may include a beam output unit capable of irradiating light (or information) 1420 to the road surface of the stop.

Further, the external device 1410 may include a controller for controlling the communication unit, the sensing unit, and the beam output unit.

The processor 870 of the vehicle control device 800 may be connected to communicate with the external device 1410 via the communication unit 810 based on the vehicle 100 entering the stop 1400.

For example, when entering the stop 1400 in which the external device 1410 is installed, the processor 870 may be connected to the communication unit of the external device 1410 by using V2X communication via the communication unit 810.

In this case, the controller of the external device 1410 may determine that the communication-connected vehicle 100 enters the stop 1400 based on the communication (or communication connection) with the vehicle 100 via the communication unit of the external device 1410, As another example, the controller of the external device 1410 may determine that the vehicle 100 enters the stop 1400 based on the reception of a specific signal (for example, information related to a transportation means) from the vehicle 100 via the communication unit of the external device 1410.

In addition, the controller of the external device 1410 may determine information related to the transportation means 910 based on the reception of the information related to the vehicle 100 from the vehicle 100 via the communication unit of the external device 1410.

For example, when the stop 1400 is sensed within a predetermined distance from the vehicle via the sensing unit 120, the processor 870 of the vehicle control device 800 may transmit the specific signal (or information related to the vehicle) via the communication unit 810.

When the specific signal (or information related to the vehicle) is received via the communication unit, the controller of the external device 1410 may transmit a response signal corresponding thereto to the vehicle 100.

The processor 870 of the vehicle control device 800 included in the vehicle 100 may be connected to communicate with the external device 1410 present at the stop 1400 based on the response signal received via the communication unit 810.

Here, the information related to the vehicle 100 may include a number assigned to the vehicle (for example, a bus number, a train number, etc.), a feature related to the vehicle (for example, color, size, etc.), and the number of vacant seats (or the number of boarded passengers) of the vehicle, route information of the vehicle, or the like.

When vehicles entering the stop are in plural, the controller of the external device 1410 may communicate with the plurality of vehicles via the communication unit of the external device 1410 to sense information related to the plurality of vehicles.

The controller of the external device 1410 may determine (generate) location information at which the vehicle 100 entering the stop 1400 is to stop based on information related to a user present at the stop.

Then, the external device 1410 may transmit location information at which the vehicle is to be located.

The processor 870 of the vehicle control device 800 may receive location information at which the vehicle is to stop from the external device 1410 via the communication unit 810.

Then, as shown in FIG. 14, the processor 870 may control the beam output unit 830 so that notification information (that is, information notifying that the vehicle 100 is to stop) 1420 for notifying a stop location to a place (for example, one region among the road surfaces of the stop 1400) corresponding to the location information in which the vehicle stops is to stop.

As another example, the notification information 1420 notifying the stop location may be irradiated by the beam output unit of the external device 1410 provided in the stop 1400.

Meanwhile, the processor 870 may determine whether an obstacle of a predetermined type is present or not in a place corresponding to the location information via the sensing unit 120.

The determination whether the obstacle of the predetermined type is present or not may be performed by the sensing unit of the external device 1410.

For example, the obstacle of the predetermined type may be an obstacle that is not boarded (or is not loaded) in the vehicle 100, and may include, for example, a garbage bin, a construction sign, a structure installed so as not to move, etc.

The user, luggage, etc., capable of boarding in the vehicle may not be included in the obstacle of the predetermined type.

Figure 15:
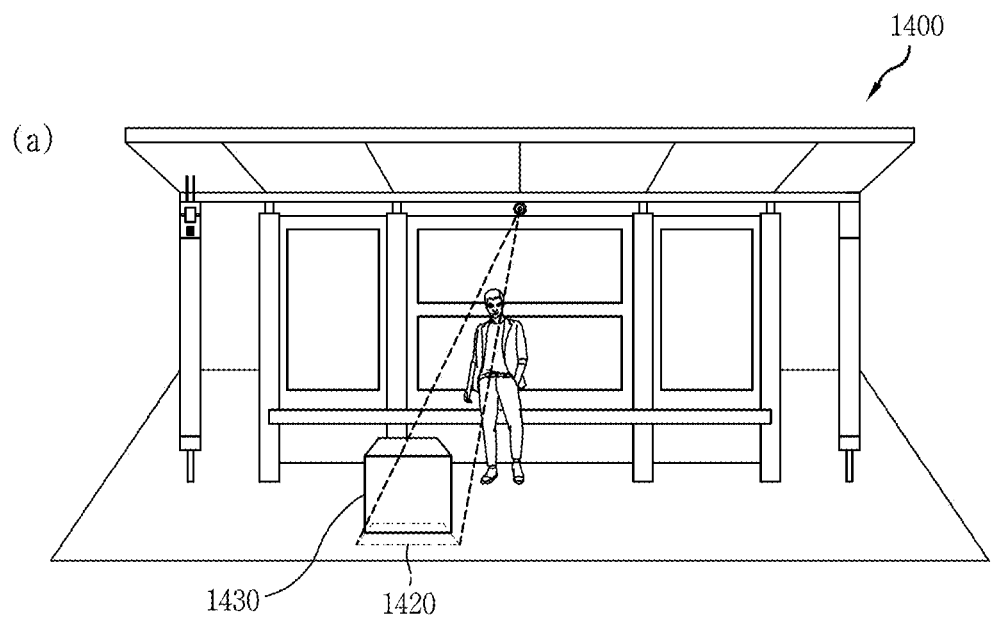
Figure 15:
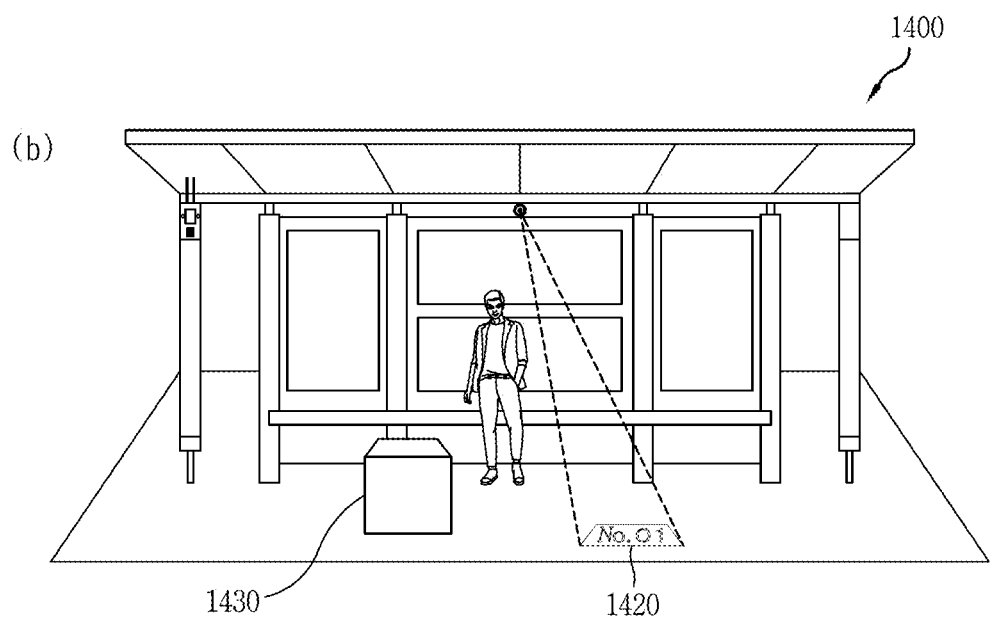

As shown in (a) of FIG. 15, when an obstacle 1430 of the predetermined type is present in a place corresponding to the location information, as shown in (b) of FIG. 15, the processor 870 may output the notification information 1420 notifying the stop location to a place different from the place corresponding to the location information.

Although not illustrated, when the obstacle 1430 of the predetermined type is present in the place corresponding to the location information, the notification information 1420 notifying the stop location may be output to the place corresponding to the location information.

The processor 870 of the vehicle control device 800 may output the notification information 1420 notifying the stop location to a place corresponding to the location information among the road surfaces of the stop 1400 directly via the beam output unit 830.

In addition, the controller of the external device 1410 installed in the stop 1400 may output notification information 1420 notifying a stop location at which the vehicle entering the stop stops to a place corresponding to the location information among the road surfaces of the stop 1400 via the beam output unit of the external device.

For example, in the present invention, when the vehicle 100 is spaced apart from the stop 1400 at a predetermined distance or more, the beam output unit of the external device 1410 may irradiate the notification information 1420 to the road surface of the stop, and when the vehicle 100 enters within a predetermined distance from the stop 1400, the beam output unit 830 of the vehicle control device 800 may irradiate the notification information 1420 to the road surface of the stop.

As another example, the present invention may determine which device outputs the notification information 1420 via the communication between the vehicle control device 800 and the external device 1410.

As another example, in the present invention, at least one of the vehicle control device 800 and the external device 1410 may irradiate the notification information 1420 to the road surface of the stop according to various conditions such as a user request, a communication state of the vehicle control device, or a state of the stop.

The processor 870 may sense a situation in the vehicle via the sensing unit 120. For example, the processor 870 may sense (determine) whether a predetermined situation occurs in the vehicle via the internal camera of the sensing unit 120.

Here, the predetermined situation may be, for example, an emergency situation, and may include cases in which a user present in the vehicle is ill, fainting, and the like.

Whether the predetermined situation occurs may be sensed (determined) through image analysis received via a camera, for example, or by a control command (specific gesture, emergency button input, etc.) of a user present in the vehicle.

Figure 16:
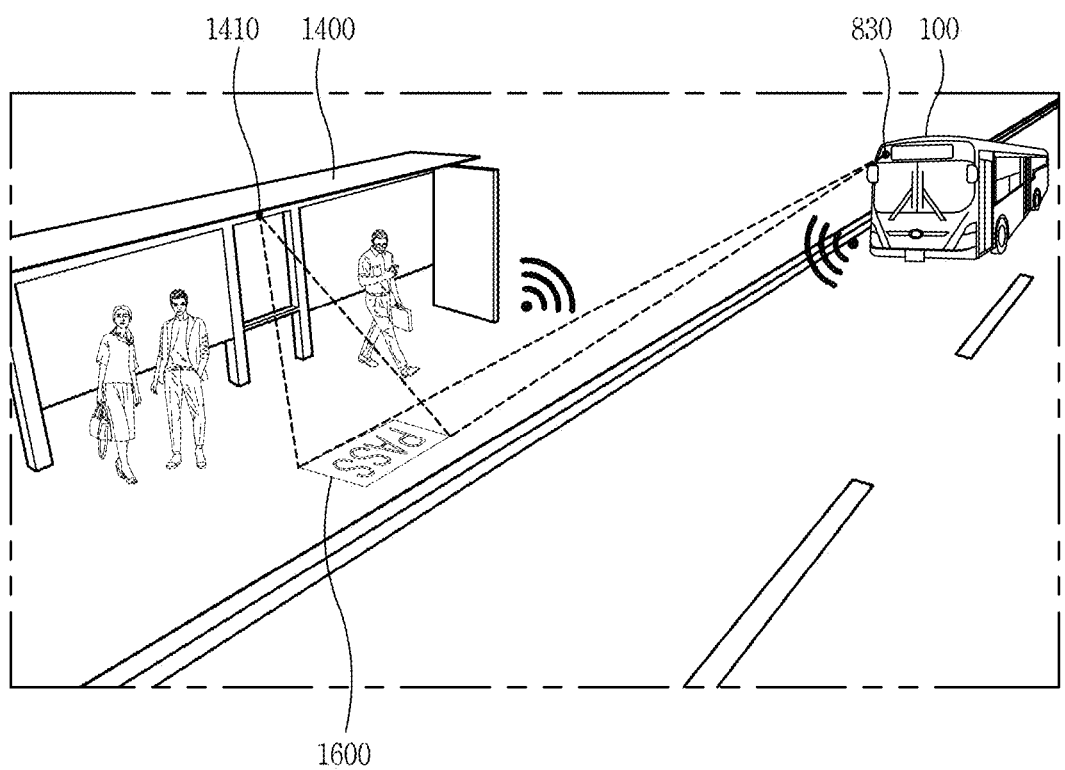

When the predetermined situation occurs in the vehicle 100 entering the stop 1400, as shown in FIG. 16, the processor 870 may control the beam output unit 830 so that information 1600 notifying that the vehicle 100 does not stop at the stop 1400 (that is, information for passing without stopping) is irradiated to the road surface of the stop 1400.

As another example, when the predetermined situation occurs in the vehicle via the sensing unit 120, the processor 870 may transmit information notifying nonstop to the external device 1410 via the communication unit 810.

Then, the external device 1410 provided at the stop 1400 may control the beam output unit of the external device 1410 so that information notifying that the vehicle does not stop at the stop is irradiated to the road surface of the stop based on the reception of the information.

Figure 17:
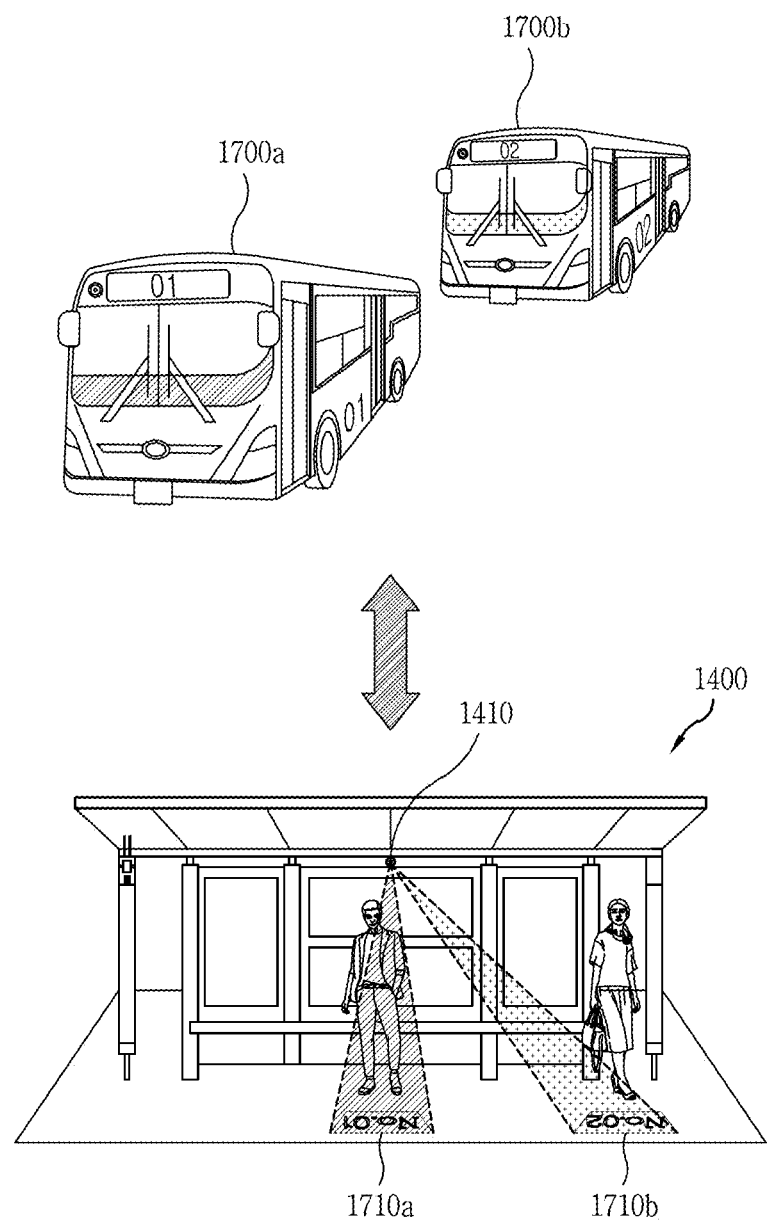

Meanwhile, as shown in FIG. 17, when a plurality of vehicles 1700a and 1700b enter the stop 1400, the controller of the external device 1410 may receive information related to the vehicle from the plurality of vehicles 1700a and 1700b, respectively.

Then, the controller of the external device 1410 may control the beam output unit of the external device so that a plurality of pieces of notification information 1710a and 1710b notifying a location in which each of the plurality of vehicles 1700a and 1700b stops are irradiated to the road surface of the stop 1400 based on the information related to the plurality of vehicles received from the plurality of vehicles 1700a and 1700b.

The notification information 1710a and 1710b may reflect information related to the vehicle (for example, a number assigned to the vehicle and a color of the vehicle).

At this point, the controller of the external device 1410 may determine the location information at which the plurality of vehicles stop based on the information related to the plurality of vehicles, and may transmit the determined location information to the plurality of vehicles, respectively.

In this case, the vehicle control device provided in the plurality of vehicles may determine the location information at which the own vehicle stops, and irradiate notification information notifying the stop location at a place corresponding to the determined location information from the plurality of vehicles to the road surface of the stop.

Figure 18:
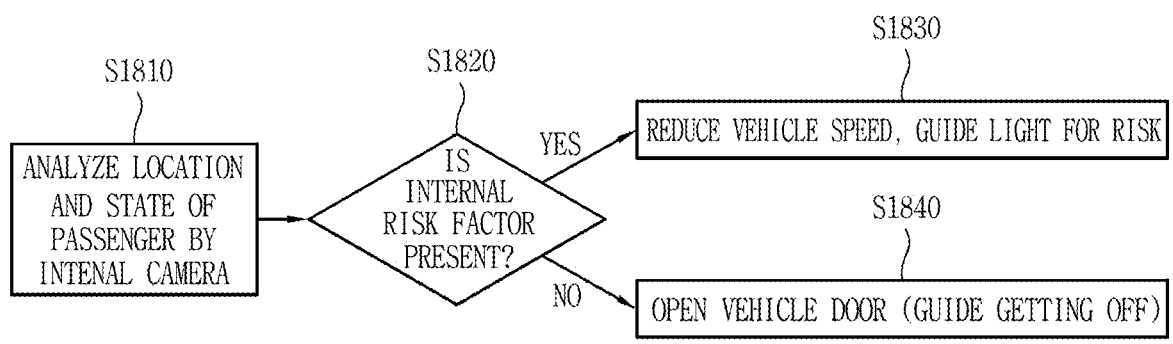
FIG. 18 is a flowchart for describing another control method of the present invention.

FIG. 18 is a flowchart for describing another control method of the present invention.

Referring to FIG. 18, the processor 870 may analyze a location and a state of a passenger inside a vehicle by using an internal camera (sensing unit 120) (S1810).

Then, the processor 870 may determine whether a risk factor inside the vehicle is present or not based on the analyzed result (S1820).

The risk factor may be set in advance and may include, for example, an emergency situation, a robber boarding, and the like.

When it is determined that a risk factor in the vehicle is present, the processor 870 may reduce the speed of the vehicle, and may output light via the beam output unit 830 or a lamp provided in the vehicle to notify the risk to the outside (S1830).

Meanwhile, when it is determined that risk factor in the vehicle is not present, the processor 870 may open the vehicle door based on a control command for opening the vehicle door, and may output guide information (or the first image) guiding the getting off to the road surface of the periphery of the vehicle door (S1840).

According to an embodiment of the present invention, there are one or more of the following effects.

First, according to the present invention, when an object approaching toward a vehicle door is present at the moment when a user boarded on a vehicle gets off, information notifying the approaching object is irradiated to a road surface of the vehicle door without opening the vehicle door, and thus It is possible to prevent an accident.

Second, according to the present invention, when an object approaching toward a vehicle door is present in a state in which the vehicle door is open, a display mode of an image irradiated to a road surface is changed while the door is closed at a preset speed, and information related to the approaching object is irradiated to the road surface additionally, and thus a user who has got off in advance escapes to a safe area quickly and a user who has not yet got off is prevented from getting off, thereby preventing an accident.

Third, according to the present invention, different information is irradiated to a road surface of a vehicle door side at the time of getting on and off, and thus it is possible to prevent a complicated situation that may occur when getting on and off and to induce a quick and safe getting on and off.

Fourth, according to the present invention, information that guides a location in which a vehicle will stop is irradiated to a road surface of a stop via communication with an external device provided at the stop, and a user who gets on the vehicle moves to the place in which the user gets on in advance, and thus it is possible to induce a quick getting on and off and to prevent complexity that may occur at the bus stop.

Effects of the present invention are not limited to the above-described effects, and other effects not described will be clearly understood by those skilled in the art from the description of the claims.

The vehicle control device 800 described above may be included in the vehicle 100.

In addition, an operation or control method of the above-described vehicle control device 800 may be applied by analogy in the same or a similar manner to the operation or control method of the vehicle 100 (or the controller 170).

For example, when a control command for opening a vehicle door is received after the vehicle stops, the control method of the vehicle 100 (or the control method of the vehicle control device 800) may include sensing whether an object approaching toward the vehicle door is present or not, and irradiating information notifying an object approaching toward the vehicle door to a road surface of a periphery of the vehicle door in a state in which the vehicle door is closed based on presence of the object approaching toward the vehicle door.

In addition, when an object approaching toward a vehicle door is sensed, the control method of the vehicle 100 (or the control method of the vehicle control device 800) may further include maintaining a state in which the vehicle door is closed regardless of the control command for opening the vehicle door.

In addition, the control method of the vehicle 100 (or the control method of the vehicle control device 800) may further include, in a state in which the vehicle door is opened by the control command, outputting a first image for guiding a getting-off passenger boarded on the vehicle to get off to the road surface of the periphery of the vehicle door, when the object approaching toward the vehicle door is sensed via a sensing unit, closing the vehicle door at a predetermined speed, and while the vehicle door is being closed at a predetermined speed, and changing a display mode of the first image irradiated to the road surface of the periphery of the vehicle door.

More specifically, embodiments may be replaced by the above description or may be applied by analogy in the same or a similar manner the same/similarly.

Each of the steps as described above may be performed by the controller 170 provided in the vehicle 100 as well as the vehicle control device 800.

In addition, all functions, configurations, or control methods performed by the above-described vehicle control device 800 may be performed by the controller 170 provided in the vehicle 100. That is, all the control methods described in the present specification may be applied to the control method of the vehicle, or may be applied to the control method of the control device.

Further, the above-described vehicle control device 800 may be a mobile terminal. In this case, all functions, configurations, or control methods performed by the vehicle control device 800 may be performed by a controller of the mobile terminal. In addition, all the control methods described in the present specification may be applied by analogy in the same or a similar manner to the control method of the mobile terminal.

In detail, the mobile terminal may be formed not only in the form of a smart phone but also in the form of a wearable device (for example, a watch, a glass, etc.).

In addition, the mobile terminal may be connected so as to communicate with the vehicle control device via a communication unit.

The mobile terminal may transmit and receive all kinds of screen information, signals related to vehicle control, and user input signals described in the present specification via the communication unit.

Further, the mobile terminal may receive all kinds of screen information described herein via the communication unit and output the screen information to a display unit of the mobile terminal. In addition, when a touch (or selection) is performed via the display unit of the mobile terminal, the touched (selected) information may be transmitted to the vehicle control device. The vehicle may be controlled based on the touched information.

In addition, the controller 170 of the vehicle (or the processor 870 of the vehicle control device) may transmit all kinds of information sensed via the sensing unit 120 of the vehicle to the mobile terminal via the communication unit. In this case, the controller of the mobile terminal may perform a function/operation/control method performed by the processor 870 of the vehicle control device described herein based on the information.

Further, the controller of the mobile terminal may control the beam output unit 830 of the vehicle control device 800 via the communication unit to irradiate information to the road surface of the periphery of the vehicle door or to irradiate light to the road surface of the stop.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A vehicle control device, comprising:
a beam output unit for irradiating light to a road surface of a periphery of a vehicle; and a processor for sensing whether an object approaching toward a vehicle door is present or not via a sensing unit provided in the vehicle based on a control command for opening the vehicle door being received after the vehicle stops, and controlling the beam output unit so that information notifying the object approaching toward the vehicle door is irradiated to the road surface of the periphery of the vehicle door in a state in which the vehicle door is closed based on presence of the object approaching toward the vehicle door, wherein the processor outputs a first image guiding getting off of a passenger boarded on the vehicle to the road surface of the periphery of the vehicle door in a state in which the vehicle door is opened by the control command, and closes the vehicle door at a predetermined speed based on the object approaching toward the vehicle door being sensed via the sensing unit.

2. The vehicle control device of claim 1, wherein, based on when the object approaching toward the vehicle door being sensed via the sensing unit, the processor maintains the vehicle door in a state in which the vehicle door is closed regardless of the control command for opening the vehicle door.

3. The vehicle control device of claim 2, wherein the processor opens the vehicle door according to the control command based on that the sensed object passes the vehicle door or the object approaching toward the vehicle door is not sensed.

4. The vehicle control device of claim 1, wherein the processor changes a display mode of the first image output to the road surface of the periphery of the vehicle door while the vehicle door is closed at the predetermined speed.

5. The vehicle control device of claim 4, wherein the first image includes a plurality of graphic objects, and
the processor varies a color of at least one graphic object adjacent to the vehicle door among the plurality of graphic objects.

6. The vehicle control device of claim 1, wherein the processor controls the beam output unit such that information related to the object approaching toward the vehicle door is further irradiated to the road surface of the periphery of the vehicle door while the vehicle door is closed at the predetermined speed.

7. The vehicle control device of claim 1, wherein the sensing unit senses a getting-off passenger present in the vehicle and a getting-on passenger present outside the vehicle, and
the processor determines a length of an image irradiated to the road surface of the periphery of the vehicle door, based on a number of the getting-off passengers or a number of the getting-on passengers.

8. The vehicle control device of claim 7, wherein the processor controls the beam output unit such that the length of the image is shortened based on that the number of the getting-off passengers present in the vehicle is decreased as the getting-off passenger gets off, or the number of the getting-on passengers present outside the vehicle is decreased as the getting-on passenger gets on.

9. The vehicle control device of claim 7, wherein the processor controls the beam output unit such that the length of the image is reduced as time passes.

10. The vehicle control device of claim 1, further comprising a communication unit configured to communicate with an external device present at a stop,
wherein the processor (i) is connected to communicate with the external device via the communication unit based on the vehicle entering the stop and (ii) receives location information for stopping the vehicle from the external device.

11. The vehicle control device of claim 10, wherein the processor:
determines whether an obstacle of a predetermined type is present or not at a place corresponding to the location information via the sensing unit,
outputs notification information notifying a stop location to the place corresponding to the location information when the obstacle of the predetermined type is not present in the place, and
outputs the notification information notifying the stop location to a place different from the place corresponding to the location information when the obstacle of the predetermined type is present in the place.

12. The vehicle control device of claim 10, wherein the processor senses whether a predetermined situation has occurred inside the vehicle via the sensing unit, and controls the beam output unit such that information notifying that the vehicle is not stopped at the stop is output to the road surface of the stop based on the predetermined situation occurring inside the vehicle.

13. A vehicle control device, comprising:
a beam output unit for irradiating light to a road surface of a periphery of a vehicle; and
a processor for sensing whether an object approaching toward a vehicle door is present or not via a sensing unit provided in the vehicle based on a control command for opening the vehicle door being received after the vehicle stops, and controlling the beam output unit so that information notifying the object approaching toward the vehicle door is irradiated to the road surface of the periphery of the vehicle door in a state in which the vehicle door is closed based on presence of the object approaching toward the vehicle door,
wherein the sensing unit senses a getting-off passenger present in the vehicle and a getting-on passenger present outside the vehicle, and
the processor irradiates a first image to the road surface of the periphery of the vehicle door such that the getting-off passenger gets off in a state in which the vehicle door opens, and controls the beam output unit such that a second image different from the first image is irradiated to the road surface of the periphery of the vehicle door so as for the getting-on passenger to get on after the getting off of the getting-off passenger is completed.

14. The vehicle control device of claim 13, wherein when it is sensed that the getting-on passenger approaches toward the vehicle door in a state in which the first image is irradiated or the getting-off passenger approaches toward the vehicle door in a state in which the second image is irradiated, the processor outputs warning information.

15. The vehicle control device of claim 14, wherein outputting the warning information includes at least one of (i) changing a color of the first image or the second image or outputting an additional image to the road surface of the periphery of the vehicle door.

16. A control method of a vehicle including a vehicle control device, the method comprising:
sensing whether an object approaching toward a vehicle door is present or not based on a control command for opening the vehicle door being received after the vehicle stops;
irradiating information notifying the object approaching toward the vehicle door to a road surface of a periphery of the vehicle door in a state in which the vehicle door is closed, based on presence of the object approaching toward the vehicle door;

outputting a first image guiding getting off of a passenger boarded on the vehicle to the road surface of the periphery of the vehicle door in a state in which the vehicle door is opened by the control command; and closing the vehicle door at a predetermined speed based on the object approaching toward the vehicle door being sensed.

17. The method of claim 16, further comprising maintaining the vehicle door in a state in which the vehicle door is closed regardless of the control command for opening the vehicle doorbased on the object approaching toward the vehicle door being sensed.

18. A vehicle, comprising:
a sensing unit for sensing information related to the vehicle;
a beam output unit for irradiating light to a road surface of a periphery of the vehicle; and
a processor for sensing whether an object approaching toward a vehicle door is present or not via the sensing unit[[ when]] based on a control command for opening the vehicle door being received after the vehicle stops, and controlling the beam output unit such that predetermined information is irradiated to the road surface of the periphery of the vehicle door based on presence of the object approaching toward the vehicle door,
wherein the processor outputs a first image guiding getting off of a passenger boarded on the vehicle to the road surface of the periphery of the vehicle door in a state in which the vehicle door is opened by the control command, and closes the vehicle door at a predetermined speed based on the object approaching toward the vehicle door being sensed via the sensing unit.

19. A vehicle control device, comprising:
a communication unit for communicating with at least one of a sensing unit or a beam output unit provided in a vehicle;
a sensor controller for communicating with the sensing unit via the communication unit in order to sense an object approaching toward a vehicle door in response to an event that the vehicle door is opened occurring or being expected to occur;
a beam controller for controlling the beam output unit via the communication unit so that information notifying the object approaching toward the vehicle door is irradiated to a road surface of a periphery of the vehicle door in a state in which the vehicle door is closed based on the object being present toward the vehicle door; and
a processor configured to:
control the beam controller to output a first image guiding getting off of a passenger boarded on the vehicle to the road surface of the periphery of the vehicle door in a state in which the vehicle door is opened by a control command, and
close the vehicle door at a predetermined speed based on the object approaching toward the vehicle door being sensed via the sensing unit.

* * * * *